(12) United States Patent
Petrie et al.

(10) Patent No.: US 7,877,922 B1
(45) Date of Patent: Feb. 1, 2011

(54) FISHING ROD AND REEL STORAGE DEVICE AND CARRIER

(75) Inventors: Aidan Petrie, Jamestown, RI (US); Daniel Nelsen, Providence, RI (US)

(73) Assignee: Thule Sweden AB, Hillerstorp (SE)

( * ) Notice: Subject to any disclaimer, the term of this patent is extended or adjusted under 35 U.S.C. 154(b) by 1218 days.

(21) Appl. No.: 10/635,899

(22) Filed: Aug. 7, 2003

Related U.S. Application Data

(60) Provisional application No. 60/401,337, filed on Aug. 7, 2002.

(51) Int. Cl.
*A01K 97/08* (2006.01)
*A01K 97/10* (2006.01)

(52) U.S. Cl. .............................. 43/26; 43/21.2; 224/922; 224/400; 224/309; 224/319; 224/321; 224/324; 224/328; 206/315.11; 211/70.8

(58) Field of Classification Search ..................... 43/26, 43/21.2; 211/70.8; 224/922, 400, 309, 310, 224/315, 317, 319, 321, 324, 327–330; 206/315.11
See application file for complete search history.

(56) References Cited

U.S. PATENT DOCUMENTS

| | | | | |
|---|---|---|---|---|
| 2,144,876 A | * | 1/1939 | Garnett ........................ 43/21.2 |
| 2,171,053 A | * | 8/1939 | White et al. ................. 224/922 |
| 2,173,953 A | * | 9/1939 | Schwisow ................... 211/70.8 |
| 2,315,387 A | * | 3/1943 | Bambenek et al. .......... 224/922 |
| 2,536,797 A | * | 1/1951 | Cooke ......................... 224/922 |
| 2,552,879 A | * | 5/1951 | Woerner ...................... 224/922 |
| 2,554,650 A | * | 5/1951 | Waite .......................... 224/922 |
| 2,682,982 A | * | 7/1954 | Fischer, Jr. .................. 224/922 |
| 2,721,680 A | * | 10/1955 | Steckman ................... 43/21.2 |
| 2,764,331 A | * | 9/1956 | Bigos .......................... 224/922 |
| 2,788,928 A | * | 4/1957 | Des Fosses ................. 224/922 |
| 2,797,851 A | * | 7/1957 | Leake .......................... 224/922 |
| 2,807,398 A | * | 9/1957 | Mathews ..................... 224/922 |
| 2,907,506 A | * | 10/1959 | Sammons ................... 224/922 |
| 3,155,299 A | * | 11/1964 | Horne et al. ................ 224/922 |
| 3,204,362 A | * | 9/1965 | Andrews ........................ 43/26 |
| 3,366,295 A | * | 1/1968 | Nygaard ..................... 224/319 |
| 3,376,614 A | * | 4/1968 | Stahl, Jr. .................... 211/70.8 |
| 3,406,930 A | * | 10/1968 | Seiler ......................... 224/922 |
| 3,487,947 A | * | 1/1970 | Bogar, Jr. .................. 211/70.8 |
| 3,524,572 A | * | 8/1970 | Hall ........................... 224/922 |
| 3,537,595 A | * | 11/1970 | Mathisen ................... 211/70.8 |
| 3,635,433 A | * | 1/1972 | Anderson .................. 211/70.8 |

(Continued)

FOREIGN PATENT DOCUMENTS

DE 19536393 A1 * 4/1997

(Continued)

*Primary Examiner*—Darren W Ark
(74) *Attorney, Agent, or Firm*—Novak Druce + Quigg, LLP

(57) ABSTRACT

A weather-tight storage device and carrier for a single or multiple fishing rods and reels releasably mounted to a vehicular roof carrier rack. When not mounted on a vehicle, the storage device and carrier is manageable enough to be hand-carried and may also serve as a stand for the rods and reels. The storage device and carrier includes a carrier box housing the fishing reels and a portion of the associated fishing rods and an anchor portion for securing the distal ends of the associated fishing rods to the vehicular roof rack.

11 Claims, 23 Drawing Sheets

U.S. PATENT DOCUMENTS

| | | | | |
|---|---|---|---|---|
| 3,641,697 A | * | 2/1972 | Heidtman et al. | 43/26 |
| D223,262 S | * | 4/1972 | Stahl | D6/552 |
| 3,662,933 A | * | 5/1972 | Michal | 224/319 |
| 3,719,297 A | * | 3/1973 | Nowicki | 224/324 |
| 3,876,076 A | * | 4/1975 | Hazelhurst | 211/70.8 |
| 3,917,137 A | * | 11/1975 | Wilkins | 224/324 |
| 4,063,646 A | * | 12/1977 | Stahl, Jr. | 211/70.8 |
| 4,071,176 A | * | 1/1978 | Tuzee | 224/324 |
| 4,084,735 A | * | 4/1978 | Kappas | 224/328 |
| 4,134,509 A | * | 1/1979 | Clement | 224/310 |
| 4,170,801 A | * | 10/1979 | Ward | 114/343 |
| 4,225,069 A | * | 9/1980 | Breitschwerdt et al. | 224/328 |
| 4,274,568 A | * | 6/1981 | Bott | 224/319 |
| 4,312,467 A | * | 1/1982 | Kulwin | 224/315 |
| 4,335,840 A | * | 6/1982 | Williams | 224/922 |
| 4,345,706 A | * | 8/1982 | Benit | 224/327 |
| 4,406,387 A | * | 9/1983 | Rasor | 224/328 |
| 4,433,804 A | * | 2/1984 | Bott | 224/321 |
| 4,523,704 A | * | 6/1985 | Washington | 224/328 |
| 4,572,416 A | * | 2/1986 | Upham | 224/328 |
| 4,728,019 A | * | 3/1988 | Olliges | 224/329 |
| 4,779,914 A | * | 10/1988 | Friedline | 211/70.8 |
| 4,858,366 A | * | 8/1989 | Rushton | 43/26 |
| 4,940,175 A | * | 7/1990 | Tittel | 224/324 |
| D311,368 S | * | 10/1990 | Garcia | D12/413 |
| 4,974,537 A | * | 12/1990 | Martin | 224/922 |
| 5,094,351 A | * | 3/1992 | Barney | 224/324 |
| 5,137,319 A | * | 8/1992 | Sauder | 211/70.8 |
| D351,498 S | * | 10/1994 | Stebbins | D3/259 |
| 5,377,889 A | * | 1/1995 | Sumino et al. | 224/324 |
| 5,415,333 A | * | 5/1995 | Wills | 224/328 |
| D360,455 S | * | 7/1995 | Dentsbier | D22/147 |
| 5,456,397 A | * | 10/1995 | Pedrini | 224/324 |
| 5,487,475 A | * | 1/1996 | Knee | 211/70.8 |
| 5,544,797 A | * | 8/1996 | Silva | 224/922 |
| 5,560,138 A | * | 10/1996 | Dentsbier | 43/21.2 |
| 5,632,427 A | * | 5/1997 | Gattuso et al. | 43/21.2 |
| 5,678,348 A | * | 10/1997 | Zielinski et al. | 43/26 |
| 5,799,848 A | * | 9/1998 | Wills | 224/328 |
| 5,937,568 A | * | 8/1999 | Morgan | 43/21.2 |
| 5,957,284 A | * | 9/1999 | Caddell et al. | 206/315.11 |
| 5,979,102 A | * | 11/1999 | Sagryn | 43/21.2 |
| 6,003,748 A | * | 12/1999 | Rivenbark | 43/21.2 |
| 6,015,074 A | * | 1/2000 | Snavely et al. | 224/324 |
| 6,186,087 B1 | * | 2/2001 | Vinas | 211/70.8 |
| 6,360,902 B1 | * | 3/2002 | Searles | 211/70.8 |
| 6,460,231 B2 | * | 10/2002 | Bourgerie | 24/487 |
| 2005/0126063 A1 | * | 6/2005 | Bowerman | 43/21.2 |
| 2006/0070292 A1 | * | 4/2006 | Fitzgerald | 43/26 |
| 2006/0237501 A1 | * | 10/2006 | Gonzalez | 224/922 |

FOREIGN PATENT DOCUMENTS

| | | | |
|---|---|---|---|
| FR | 2604057 A1 | * | 3/1988 |
| JP | 2001292676 A | * | 10/2001 |
| JP | 2006141245 A | * | 6/2006 |
| JP | 2008136408 A | * | 6/2008 |
| WO | WO 03101825 A1 | * | 12/2003 |

* cited by examiner

FISHING ROD AND REEL STORAGE DEVICE AND CARRIER

CROSS-REFERENCE TO RELATED APPLICATIONS

The present application claims the benefit of U.S. Provisional Patent Application No. 60/401,337 filed 7 Aug. 2002. Said application is expressly incorporated by reference in its entirety.

BACKGROUND OF THE INVENTION

The invention relates to a weather-tight storage device and carrier for a single or multiple fishing rods and reels that is releasably mounted to a vehicular roof carrier rack. When not mounted on a vehicle, the storage device and carrier is manageable enough to be hand-carried and may also serve as a stand or storage facility for the rods and reels.

Carriers for fishing rods and reels are well known in the art, including vehicle-mounted carriers. The vehicle-mounted fishing equipment carriers range from those that mount directly onto the vehicle via various mounting devices to those that mount onto vehicle roof racks. While both methods offer conveniences, roof-rack mounted carriers are often more desirable since roof mounting offers secure transport without interfering with the driver's vision.

Many vehicles come from the factory with general-purpose vehicular roof racks installed. For those vehicles not having factory-installed roof racks, after-market roof racks for assorted and specific applications are also available. Since roof racks come in several configurations, it is important to make a fishing equipment carrier adaptable for mounting onto the various roof rack configurations.

While these vehicle roof racks provide a convenient and efficient means for transporting fishing rods and reels, the roof of a vehicle is exposed to numerous contaminants and weather-related elements. Debris from the road, dust, insects, grime, oil, water, ice and many other elements can come into contact with the fishing rods and particularly the reels, significantly impairing the performance of, or destroying the rods and reels.

Once the user is ready to use or store the fishing rods and reels, either the carrier or the fishing rods and reels must be detached or unfastened from the vehicle. Fishing equipment may be bulky and awkward or difficult to handle as individual components. Moreover, if several fishing rods and reels are being transported, safe and expeditious transport may not be possible. Thus, it is advantageous to utilize the vehicular carrier to hand-carry the fishing equipment to and from the vehicle. It is also desirable that the carrier be adaptable for use as a support stand so that the same transport device may be used to store and carry the fishing rods and reels throughout all stages of the transport and storage process.

There is therefore a need for a fishing rod and reel storage device and carrier capable of receiving a single or multiple fishing rods and reels that is adaptable for mounting on a vehicular roof rack and that is resistant to weather and contaminants while readily fastenable and removable from the roof rack for subsequent hand-carried transport. There is also a need for a fishing rod and reel storage device and carrier adaptable for use as a support stand for supporting the fishing rods and reels when the rods and reels are not in use.

SUMMARY OF THE INVENTION

The present invention comprises a weather and contaminant resistant fishing rod and reel storage device and carrier adaptable for attachment to a roof rack of a vehicle that is readily fastenable and removable from the roof rack for subsequent hand-carried transport. Additionally, the storage device of the present invention is adaptable for use as a support stand for supporting the fishing rods and reels when the rods and reels are not in use.

In particular, the carrier arrangement of the present invention includes a carrier box, having a lid portion and a base portion, interiorly configured to receive and support at least a fishing reel and a portion of a fishing rod, an access aperture through the carrier box allowing a portion of a fishing rod to project outside the carrier box and a clamping arrangement or member configured to releasably fasten upon a vehicular carrier rack. The carrier box is configurable between an open or closed configuration and is substantially weather-tight in the closed configuration. The lid portion and the base portion are hinged together to pivot relative to each other and a sealing member is provided at the lip portions of the lid and base portions sealing the interior of the box from undesirable contaminants.

The carrier arrangement of the present invention also includes a sealing member or a pliable buffer of weather-resistant material disposed or arranged within the access aperture and form-fitting about the portion of the fishing rod projecting through the aperture so that the material forms a weather-resistant barrier about that portion of the fishing rod. The carrier arrangement further includes an anchor arrangement or a clamping member for securing a distal end of the fishing rod installed in the carrier to the vehicular carrier rack.

The carrier arrangement of the present invention also is adapted for use as a free standing storage arrangement for a single or multiple fishing rods and reels when the carrier box is detached from the vehicular carrier rack.

It is to be understood that other advantages of the present invention will be made apparent by the following description of the drawings according to the present invention.

DETAILED DESCRIPTION

The present invention relates generally to a fishing rod and reel storage device and carrier arrangement having a box with an interior substantially sealed from weather elements and configured to receive at least one fishing reel and a portion of an associated fishing rod and a anchor member for securing a distal end of the fishing rod. The box and the anchor member may be releasably fastened to a roof rack via connecting members or the box may stand alone as a support stand when the storage device and carrier arrangement are not attached to a vehicular roof rack.

Figure 1:
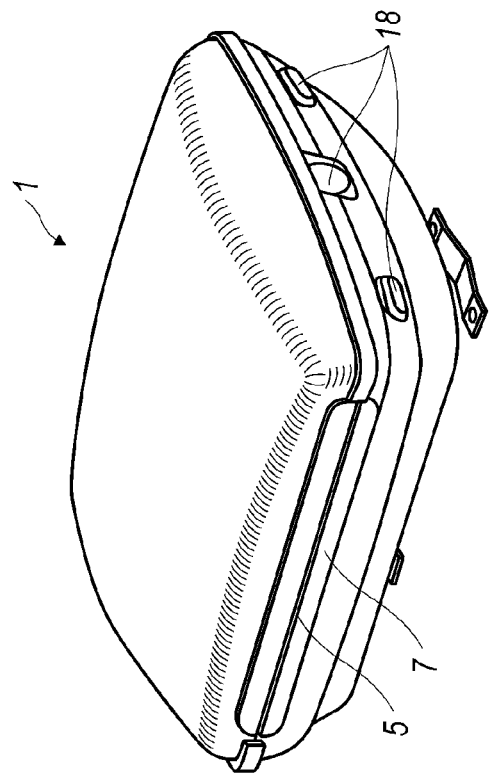
FIG. 1 is a perspective view of one preferred embodiment of the present invention.
Figure 1:
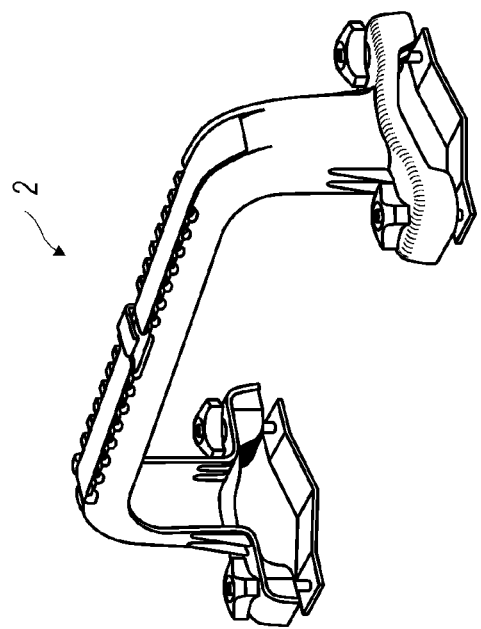

As shown in FIG. 1, the storage device and carrier arrangement for one or more fishing rods and reels of the preferred embodiment is adaptable for attachment to the roof rack of a vehicle. Preferably, the storage device and carrier arrangement releasably fastens upon the roof rack via connecting members or the like. The storage device and carrier arrangement may also include a handle so that the device may be hand-carried to and from the vehicle. The storage device and carrier arrangement of the preferred embodiment is also configured to stand alone as a support stand for the fishing rods and reels when not in transport.

More specifically, the storage device and carrier arrangement of the preferred embodiment includes a box carrier 1 and an anchor member or arrangement 2. The box carrier preferably comprises a base portion 3 and a lid portion 4 and is configurable between an open and closed position. In the preferred embodiment, the interior of the box is configured to receive one or more fishing reels and at least a portion of the fishing rods associated with the one or more fishing reels. The configuration of the interior of the box is preferably a void cavity but may be specifically tailored to accept reels of various types such as spinning or fly reels and reels reels of various sizes. Preferably, the box carrier includes at least one connecting member for removably fastening the box carrier to the roof rack of a vehicle.

The box carrier of the preferred embodiment is also provided with an access aperture through at least the forward end of the box. The access aperture 5 is configured to permit a portion of a fishing rod to project outside the carrier box from the inside of the box. It is preferred that the lip or edge portions of the lid and base members mate to form the access aperture when the carrier box is in a closed position. A second access aperture may also be formed in the rear end of the box. The second access aperture is configured to permit the butt end portions or handles of the rods to project outside the carrier box from the inside of the box.

In the preferred embodiment, a sealing member, pliable member or gasket is also provided between the lid and base portions of the box carrier to substantially seal the interior of the box from any weather elements or environmental contaminants. The sealing member, pliable member or gasket is manufactured from a material that is capable of forming a weather and contaminant resistant barrier. A pliable buffer is also preferably provided within the interior of the access aperture and the buffer is configured to form-fit about the portion of the fishing rod disposed or positioned within the access aperture when the box carrier is in the closed position.

Additionally, it is preferred that a brush or bristle gasket be provided external of the aperture to provide additional barrier from weather and environmental elements. The bristle gasket includes individual bristles that are flexible to facilitate the passage of the rods through the gasket. The bristles of the gasket are preferably attached to the top edge of the aperture but also may be attached to the bottom edge or both edges of the aperture. The bristle gasket is disposed outside of the aperture so any contaminants stopped by the gasket fall outside the box.

Referring back to FIG. 1, the base portion is preferably coupled to the lid portion via hinges or other connecting members that allow the lid portion to pivot relative to the base portion from a closed position to an open position. The hinges are preferably spring-biased to an open position to counterbalance the weight of the lid portion of the box when the box is being opened.

Although the preferred embodiment includes a hinged connection between the lid and base member, it is to be understood that any suitable connection may be used that provides a substantially sealed environment for the interior of the box. For example, the lid portion may be separably connected to the base portion. Thus, the lid portion is removed from the box carrier when the box carrier is in the open position and the lid portion is connected to the base member when the box is in the closed position. The lid portion snaps or locks securely into place to substantially seal the interior of the box from external elements.

With the lid in an open position, one or more fishing reels and a portion of the associated fishing rods may be set into the box carrier. Preferably, as shown in FIG. 1, the box receives the fishing reel and at least an adjacent portion of the associated fishing rod. The adjacent portion of the fishing rod typically includes the handle of the fishing rod.

The preferred embodiment includes a clamshell design for the box carrier. In this embodiment, the hinged connectors 6 are disposed at a side end of the box so that the front end of the lid portion is raised when the box is in an open position. The access aperture is located at the front end of the box. The access aperture is preferably formed by recesses in the front edges or front lip portions of one or both of the lid and base portions of the box. These recesses are preferably continuous along substantially the entire front edges or front lip portions of the one or both of the lid and base portions of the box, thus forming a single, generally rectangularly-shaped, access aperture when the box is in the closed position.

While a single rectangular access aperture may be shown, it is to be understood by one of ordinary skill in the art, that smaller, distinct recesses in the front edges or front lip portions of one or both of the lid and base portions of the box may be provided to form multiple, smaller and discreet access apertures when the box is in a closed position. Additionally, a second aperture may be formed in the rear end of the box to accept the butt or handles of the rods. In this configuration, the hinges would be positioned on a side of the box and the box would open from one side to the other instead of front to back.

A barrier member 7 is preferably provided in the access aperture. The barrier member is preferably a pliable buffer or gasket and is arranged and disposed within the access aperture. The buffer is adapted to form-fit about the portion of the fishing rod positioned in the access aperture as the fishing rod extends from the interior of the box through to outside the box. The buffer is preferably manufactured from a material that is pliable and can form a weather-resistant barrier between the interior and exterior of the box when the box is in a closed position. It is preferred that the buffer is pliable enough to form the weather-resistant barrier along the entire access aperture at points along the aperture both with and without a fishing rod being positioned therein. Thus, the weather resistant barrier is maintained when the box is in the closed position even if the carrier box is not full to capacity. The buffer may be manufactured out of extruded rubber, high-density foam or other compounds exhibiting the suitable characteristics. The thickness of the buffer depends on the properties of the material used.

Again, as described above, a second access aperture 8 formed in the back end of the box may be provided to accept the butt end or handles of the rods. The second access aperture preferably has the same properties and configuration and the first access aperture.

A sealing member or gasket may also be provided around a portion or the entirety of the perimeter of one or both of the lip and base portions of the box. Again, when the box is in a closed position, the interior of the box is substantially sealed from weather elements and contaminants.

The preferred embodiment of FIG. 1 shows the box carrier mounted onto a vehicle roof rack. A connecting member is used to releasably fasten the box atop the roof rack and is designed to mount the carrier box to both factory-installed and after-market specialized roof racks, including square, rectangular and round load bars. Since the box carrier is preferably mounted on top of the vehicular roof rack when installed, the connecting member is coupled to the bottom of the base portion of the box.

Figure 3:
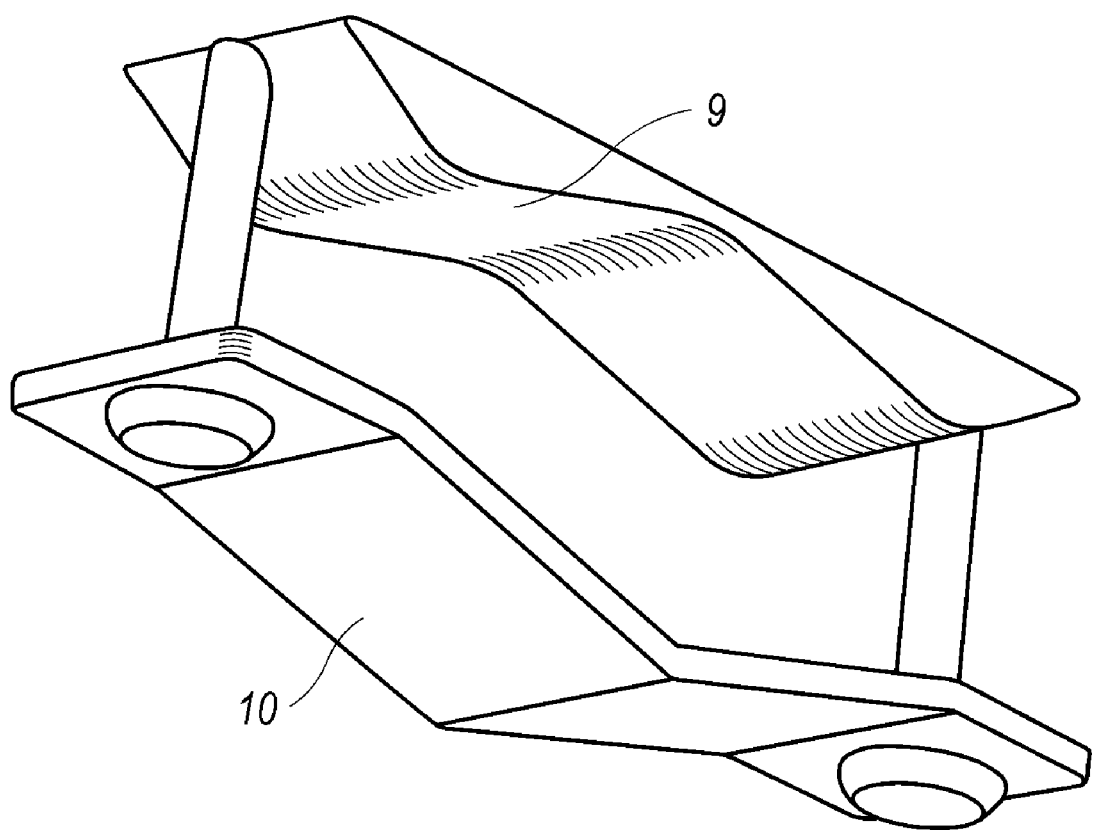
FIG. 3 is a perspective close-up view of the connecting member of the carrier box of the preferred embodiment.
Figure 4:
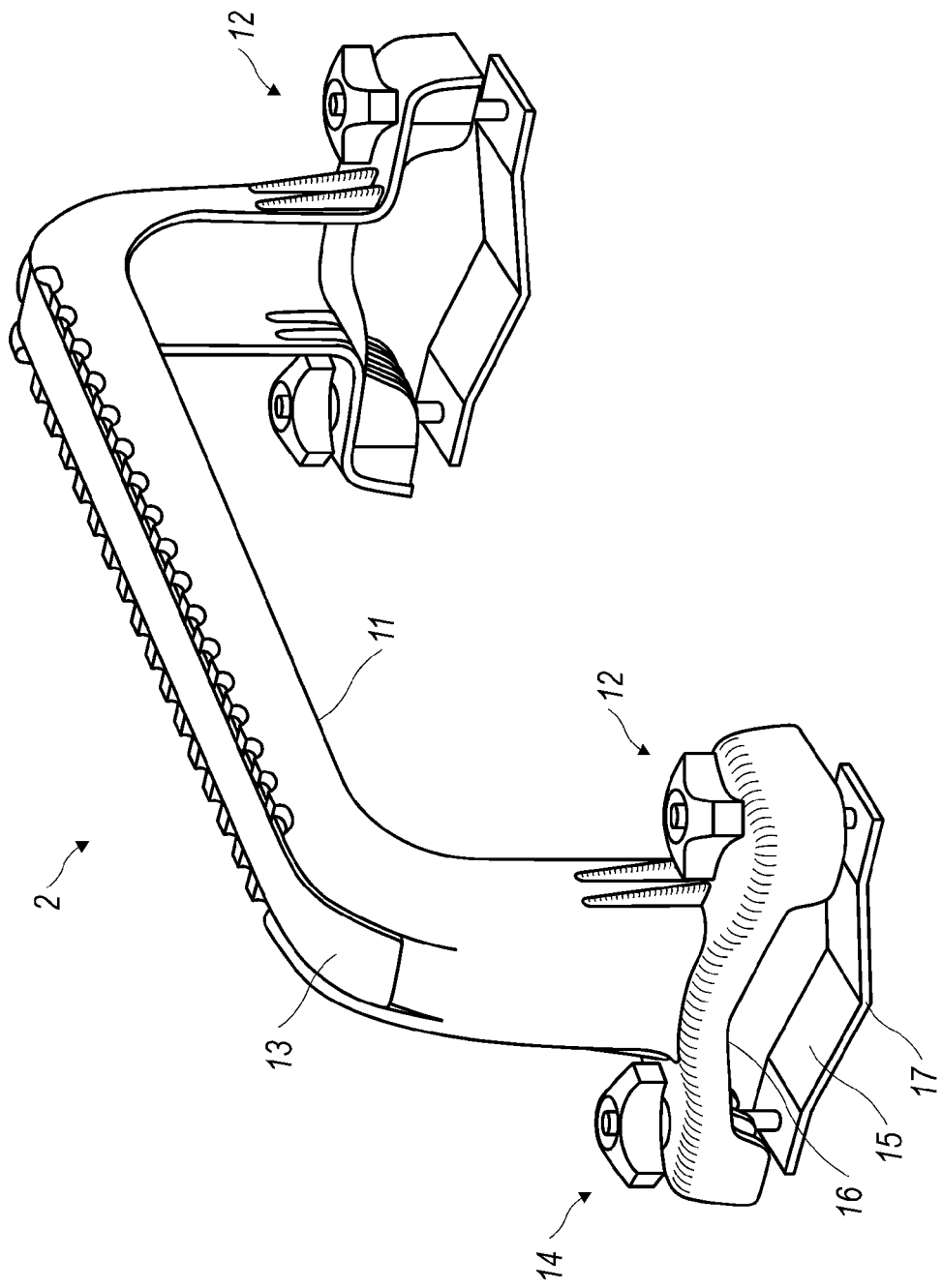
FIG. 4 is perspective view of the anchor member of the preferred embodiment with the securing member installed thereon.

The connecting member of the preferred embodiment, illustrated in FIG. 3, comprises a mounting bracket having at least a pair of threaded bolts or pins and at least a pair of threaded fastening members or knobs. The bracket is configured to fit under a roof rack load bar with the bolts extending upward beyond the load bar. The extending bolts are designed to enter the box through apertures in the bottom surface of the base portion of the box. The box is then secured to the load bar of the roof rack by threading the fasteners onto the threaded bolts inside the box.

It is preferred that the fasteners are fabricated out of a strong but smooth material, such as hard plastic, that will not excessively scratch or otherwise damage the rods and reels that come into contact with the fasteners inside the box. For this same reason, it is also preferred that no portion of the bolts are exposed beyond the fasteners. Additionally, having the fasteners secure the box to the load bar from the inside of the box prevents the detachment of the box from the load bar without gaining access to the inside of the box. Thus, when the box is locked, both the contents of the box and the box itself are protected from theft.

To assure proper fitting of the carrier box upon load bars of varying designs, an angled or "V-shaped" recess portion 9 is preferably formed in the bottom of the base portion of the box. A corresponding angled recess portion is fashioned in mounting bracket 10. The recess portions of the box base and the bracket form a gap between the base portion and the bracket that is wider at the center than at the sides, as shown in FIG. 3. The gap accommodates load bars of different cross-sectional shapes and sizes while balancing and securing a centered orientation of the carrier box upon the load bar.

It is also preferred that a reinforcing member be utilized to reinforce the bottom portion of the box base when the box is mounted onto a vehicular roof rack. The reinforcing member is preferably a metal plate and the metal plate is preferably snap-fit or otherwise affixed to the interior of the box. The metal plate includes apertures to at least overlay the apertures formed in bottom of the base portion of the box to accept the bolts of the mounting bracket. The reinforcing member prevents damage to box due to high torque or stress applied to box while the box is mounted on the roof rack.

Additionally, it is preferred that a buffer is provided atop the reinforcing member to protect the rods and reels inside the box from scratches and other damage that may result from contact with the reinforcing member. The buffer also minimizes any noise that may be created when the contents of the box come into contact with the reinforcing member. The buffer may be rubber or foam, and includes apertures to match the apertures of the reinforcing member and the bottom of the box base.

The box carrier may be mounted to the roof rack at any point along the longitudinal length of the box. In fact, the connecting member may be configured to be adjustable in both the longitudinal and transverse directions about the base of the carrier box to accommodate fishing rods and roof racks of varying lengths. Alternatively, the connecting members may be positioned on the front or rear end of the box below the hinged connection of the lid and base portions of the box so as not to interfere with the opening of the box. Here, the rear end of the box would be coupled to the vehicular roof rack.

The carrier box also preferably includes small drainage or weep holes and/or air vents to allow the reels to dry after exposure to water. Since it is desirable that the interior of the box is substantially sealed from weather elements and outside contaminants, the drainage holes and air vents are small in size and are located at the lowest points on the bottom of the base portion. Thus, direct exposure to the weather elements and environmental contaminants is avoided when the carrier box is mounted on a vehicular roof rack.

The anchor member 2 of the preferred embodiment is also illustrated in FIG. 1. The anchor member or anchor arrangement of the preferred embodiment includes a support portion or member 11, a mounting portion 12 and a securing portion or member 13. The anchor member 2 is removably secured to a load bar of a vehicle roof rack at the mounting portion via a connecting member and is configured to receive the distal ends of the fishing rods associated with the fishing reels housed in the box carrier. The anchor member is preferably configured to releasably fasten upon a vehicular roof carrier rack at any position along the length of the roof rack load bar.

Conventionally, vehicular roof racks include a front load or cross bar and a rear load or cross bar separated by what is usually a variable distance. The anchor member is preferably attached to the roof rack load bar at a distance from the rear roof rack load bar retaining the carrier box. However, it is to be understood that this arrangement may be reversed.

Referring now to the anchor member of the present invention, the support portion 11 of the anchor member preferably includes a scalloped, serrated or grooved top portion, each serration or groove configured to receive a distal end of a fishing rod set in the carrier arrangement. The top portion is preferably lined with a buffer strip at the portions provided with grooves or serrations. The buffer strip engages the aforementioned distal ends of the fishing rods set therein so as not to damage the fishing rods. The buffer strip is preferably flexible to conform to the serrations or grooves of the top portion.

In the embodiment wherein the carrier box includes discrete and separate multiple access apertures, each groove or serration of the top portion of the support member is preferably lined up with a single access aperture to provide adequate spacing between each rod held in the carrier arrangement. Moreover, it is preferred that the height of the top portion and the access apertures of the carrier box be substantially equal so that the fishing rods set in the storage device and carrier arrangement are substantially level relative to the roof of the vehicle and substantially perpendicular relative to load bars of the roof rack, preventing any undue strain on the fishing rods in the carrier arrangement.

Additionally, the top portion of the support member preferably includes an end aperture formed proximate to a first end of the top portion and a projection or hook formed proximate to a second end of the top portion. The end aperture and hook are therefore located on opposite sides of the top portion with the grooves or serrations disposed on the top portion therebetween. The top portion of the support member further comprises a center aperture divided by a tab portion. The center aperture is disposed substantially in the center of the top portion of the support member.

In the preferred embodiment, the anchor member 2 also includes a securing portion 13. The securing portion 13 preferably overlays the top portion of the anchor member to retain the distal ends of the fishing rods in the anchor member. The securing portion 13 is preferably an elastic member overlaying the top portion of the support member to retain the distal end of each fishing rod set in the support member. The elastic member is preferably a flat and flexible band, but it is to be understood that the band may also incorporate tabs that correspond to the grooves or serrations of the top portion of the support member.

The elastic securing member preferably includes a protuberance or bulb at a first end and an opening formed proximate to the second end. The bulb is formed to be larger than the end aperture of the top portion of the support member so that the bulb cannot pass through the end aperture. Furthermore, the opening formed in the securing member is sized and configured to catch the hook formed on the top portion of the support member.

Figure 5:
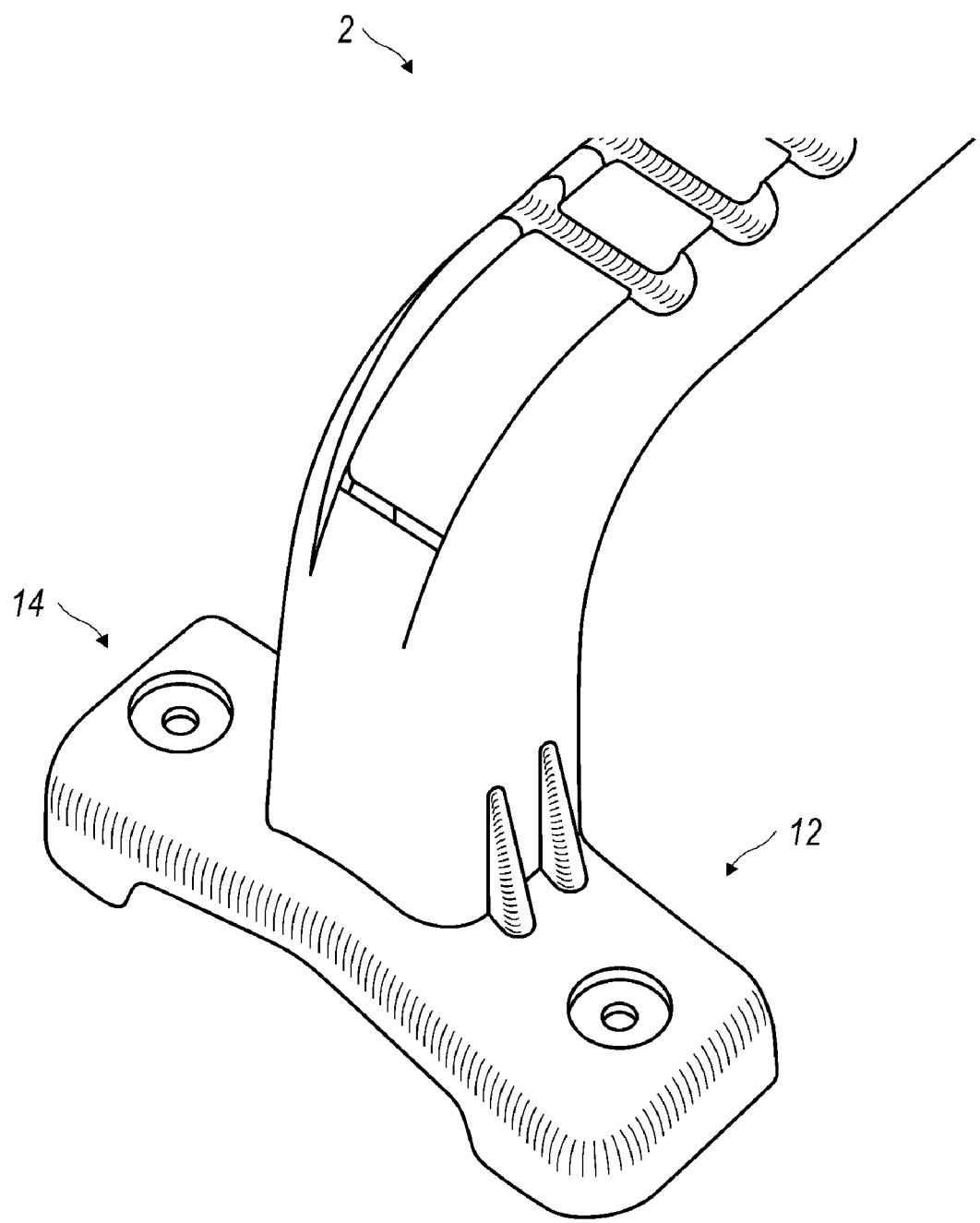
FIG. 5 is perspective view of the underside of the anchor member showing the end aperture of the top portion.
Figure 6:
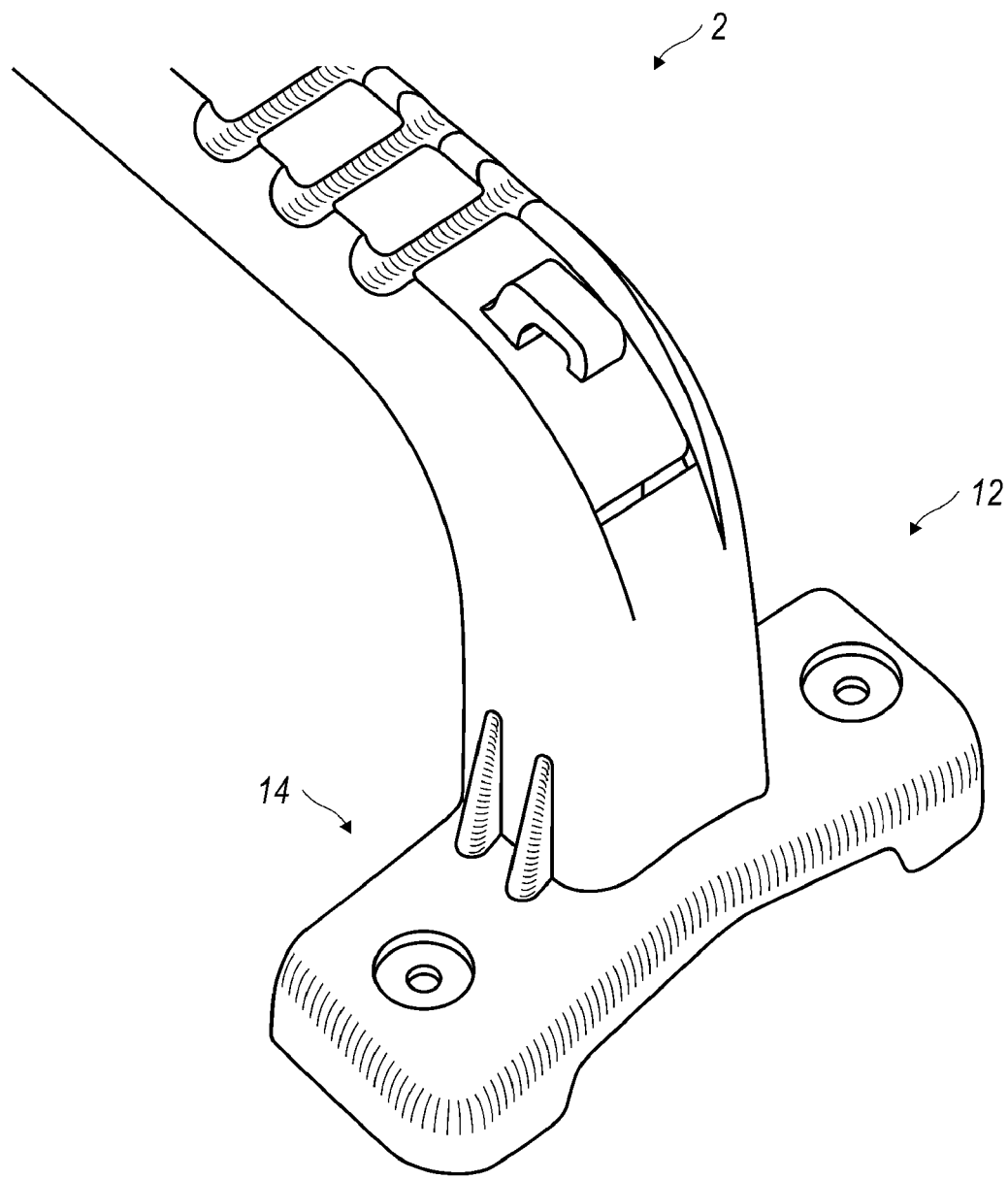
FIG. 6 is a perspective view of the anchor member showing the hook formed on the top portion.

In the preferred embodiment, the securing member 13 is attached to the anchor member 2 and set in a securing position by threading the second end of the elastic member from the bottom of the support member, through the end aperture formed through the top portion of the support portion, shown in FIG. 5, continuing to thread the second end of the elastic member so that it loops about the tab formed in the center aperture of the top portion, and finally, catching the opening formed in the elastic member about the hook formed atop the top portion. At this point, the bulbous first end of the elastic member abuts the underside of the support member at the end aperture, restraining the elastic member from passing through the end aperture of the top portion. With both the first and second ends of the elastic member being restrained from movement, the elastic member is thus securely held in place, overlaying the top portion of the support member with the distal ends of fishing rods therebetween.

Figure 7:
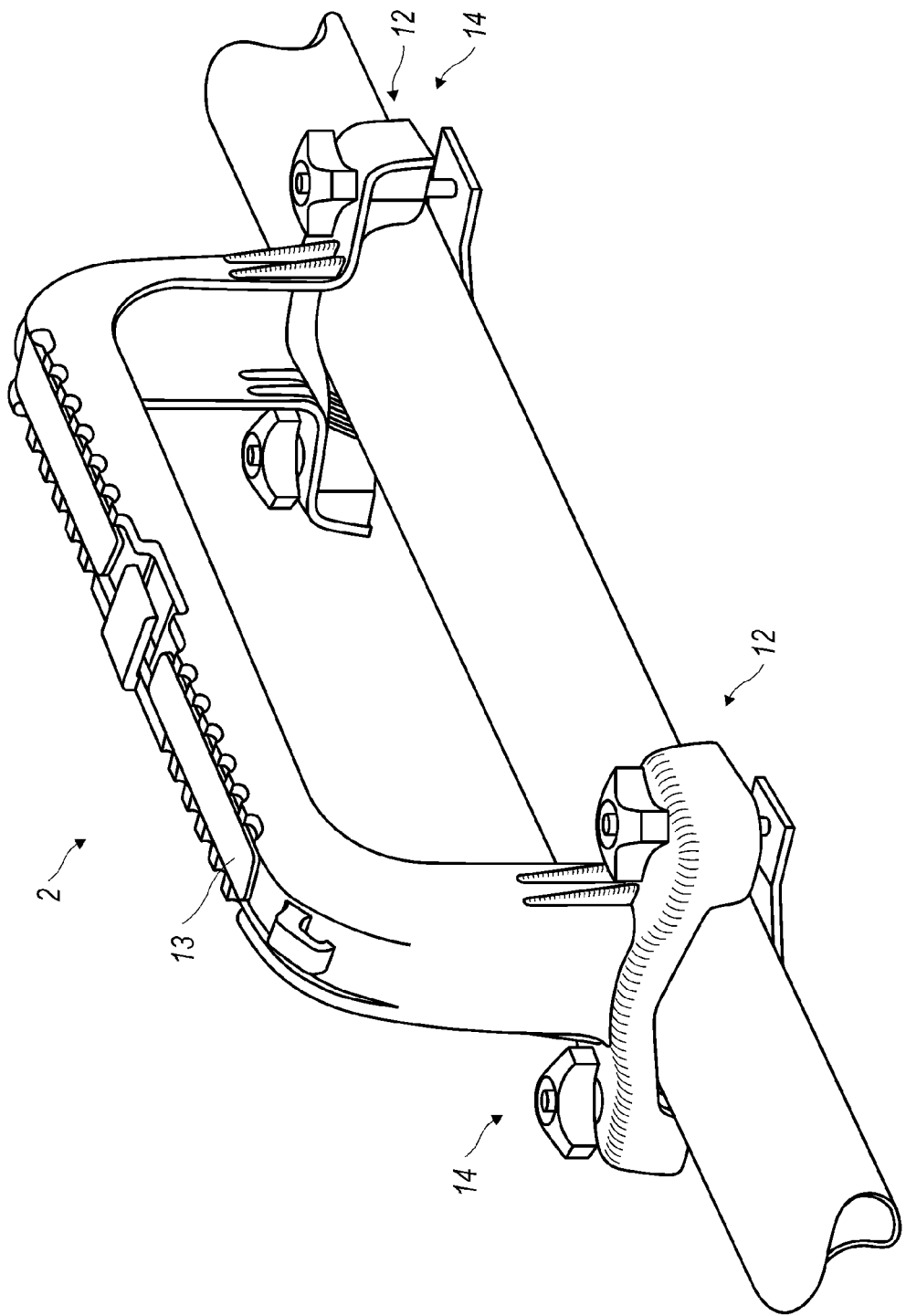
FIG. 7 is perspective view of the anchor member without the securing member installed and showing the connecting member of the anchor member.
Figure 8:
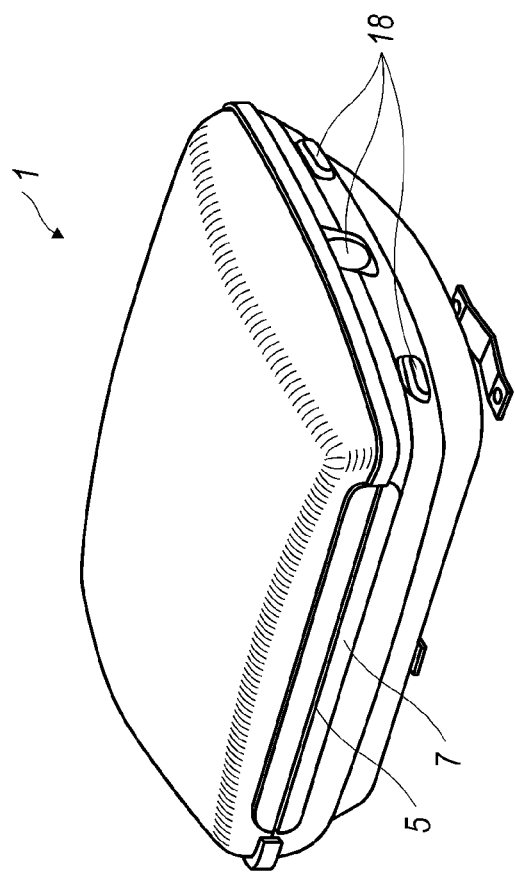
FIG. 8 is a perspective view of another preferred embodiment of the present invention.
Figure 8:
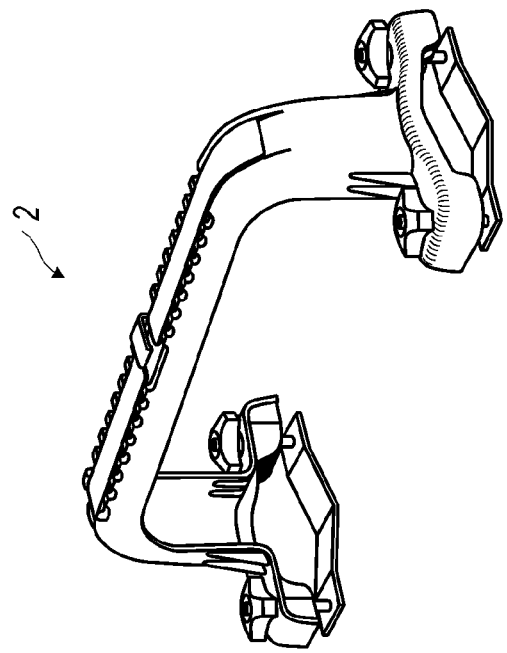
Figure 9:
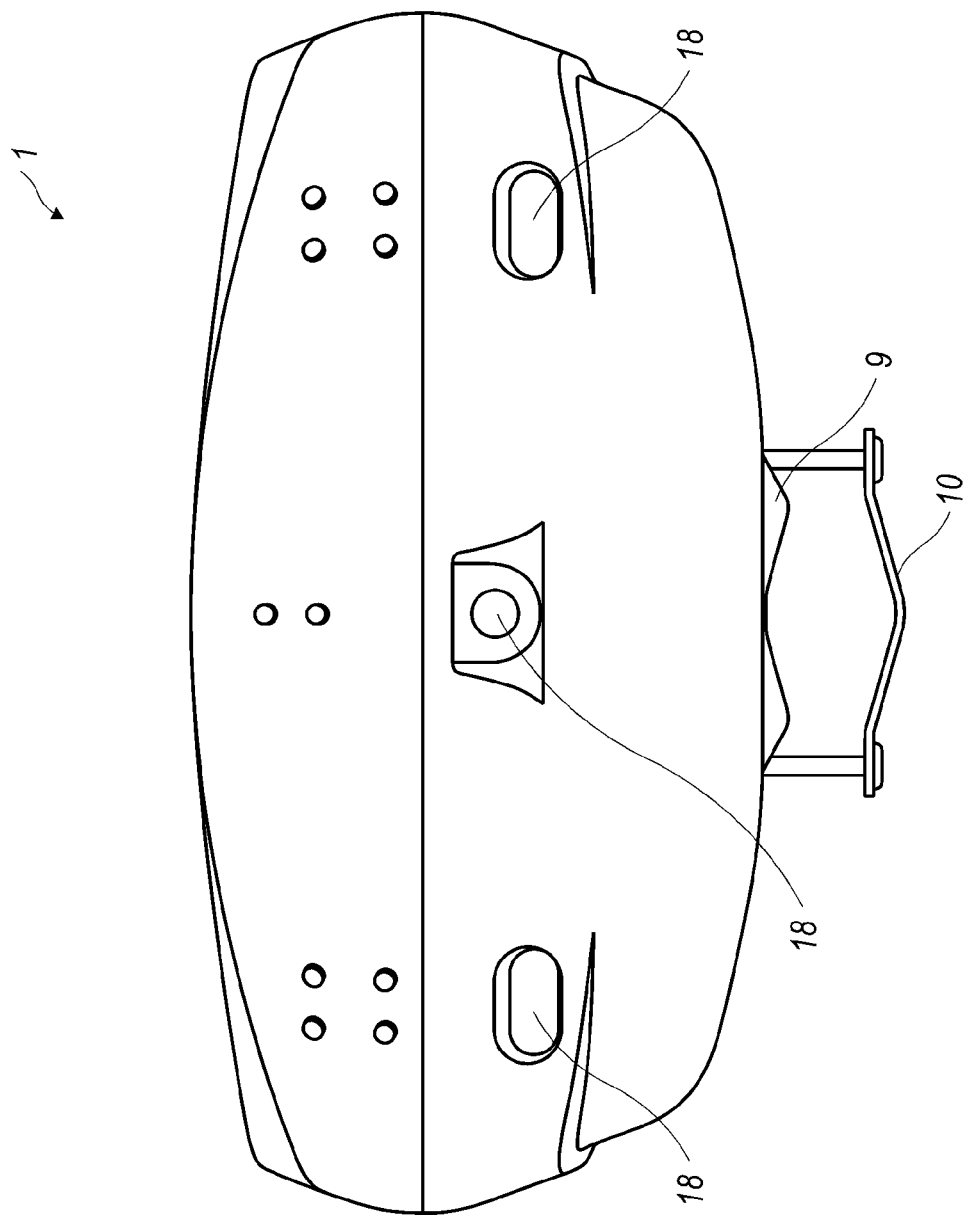
FIG. 9 is a front view of the carrier box, showing the connecting member, the lock and the latching members.
Figure 10:
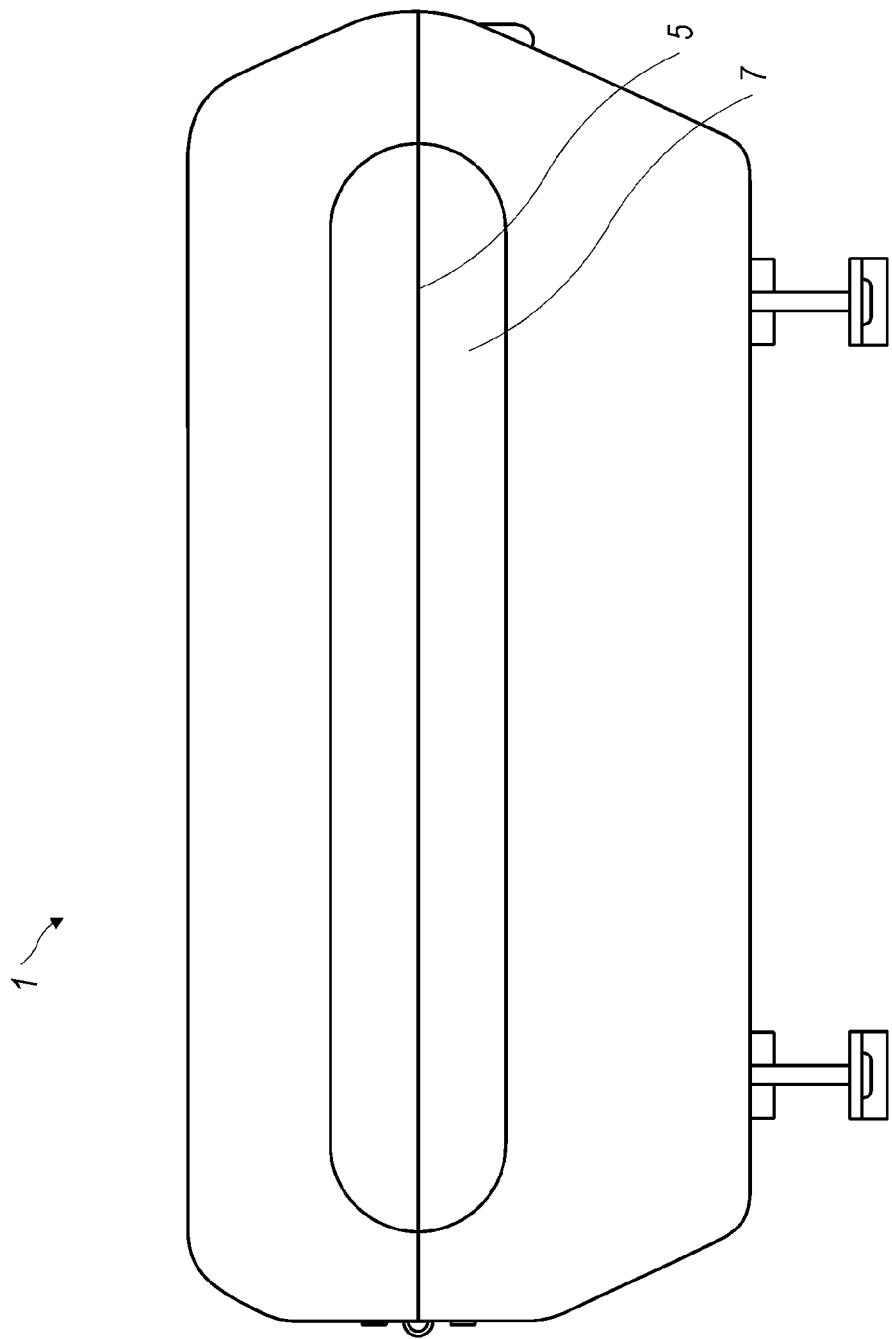
FIG. 10 is side view of the carrier box of the preferred embodiment.
Figure 11:
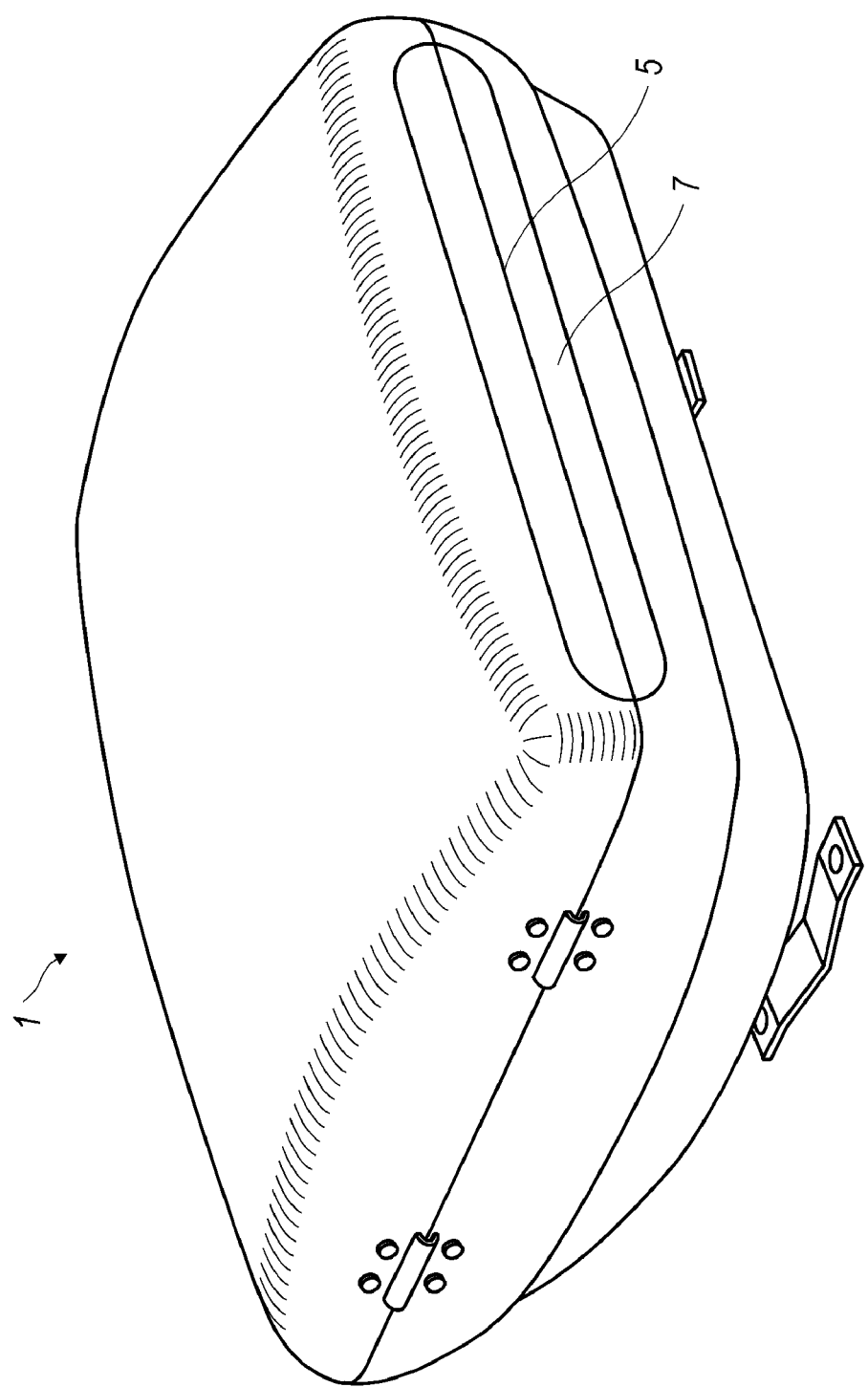
FIG. 11 is a side perspective view of the carrier box of the preferred embodiment.
Figure 12:
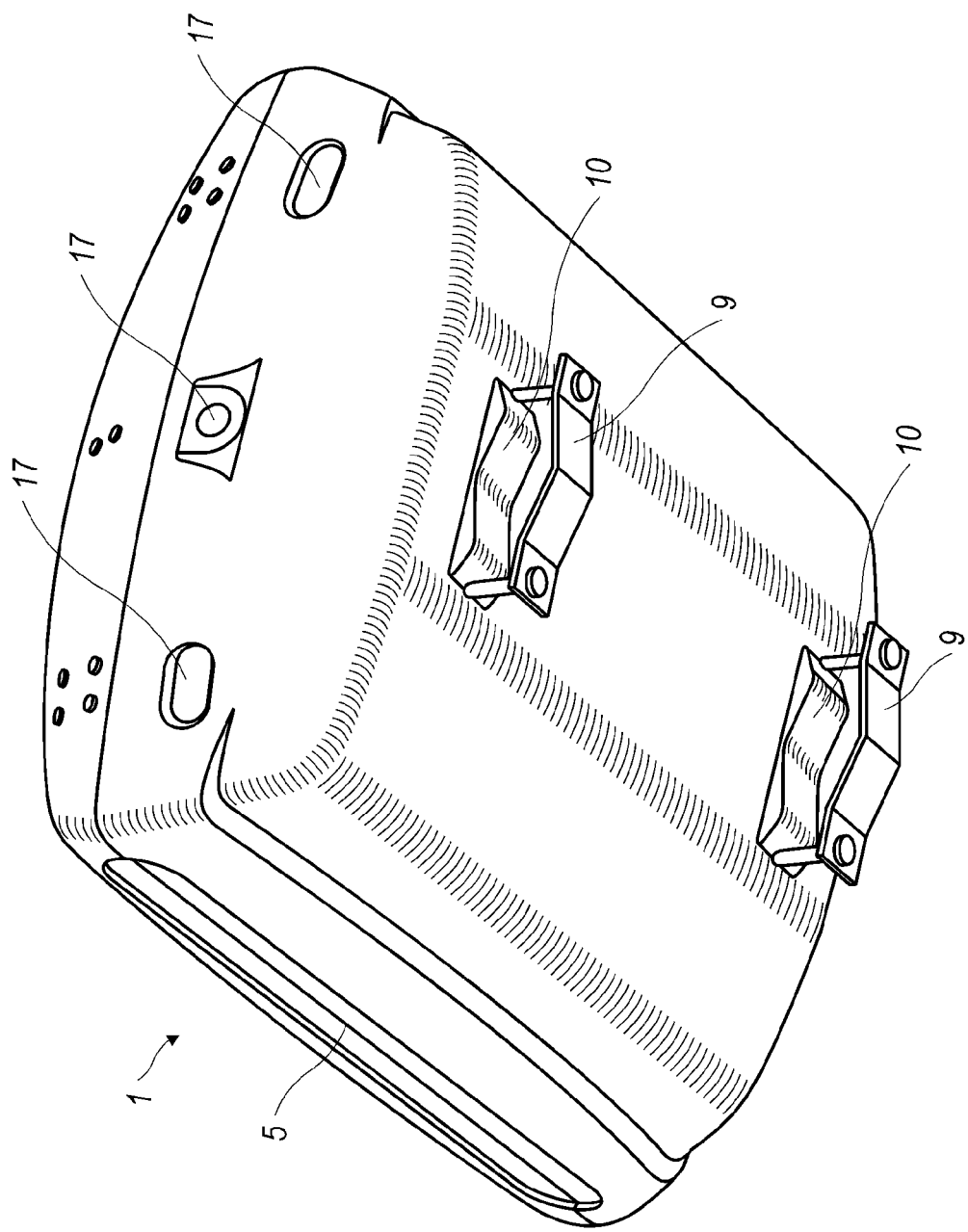
FIG. 12 is bottom perspective view of the carrier box of the preferred embodiment.
Figure 13:
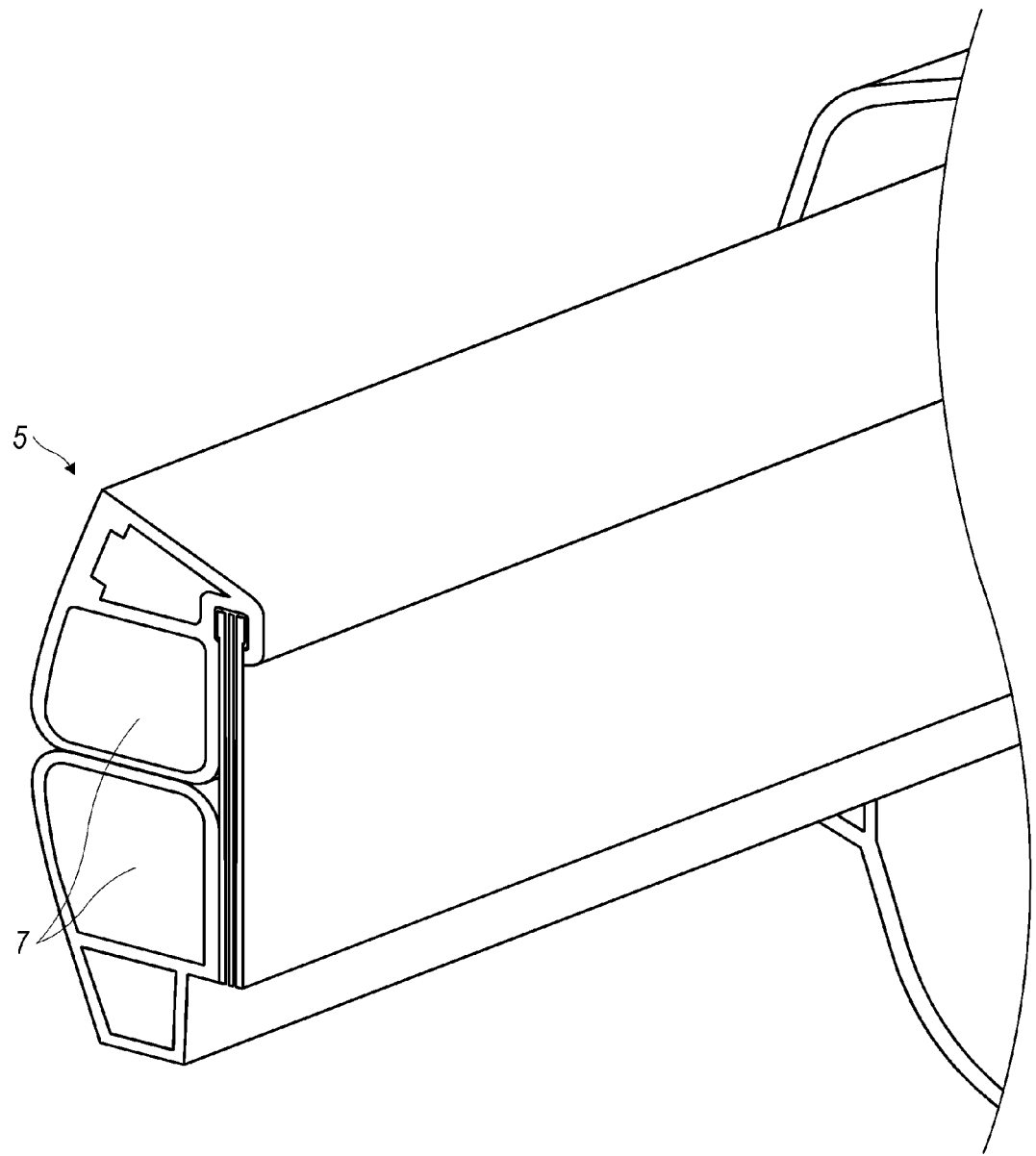
FIG. 13 is a close-up perspective view of the access aperture of the carrier box.
Figure 14:
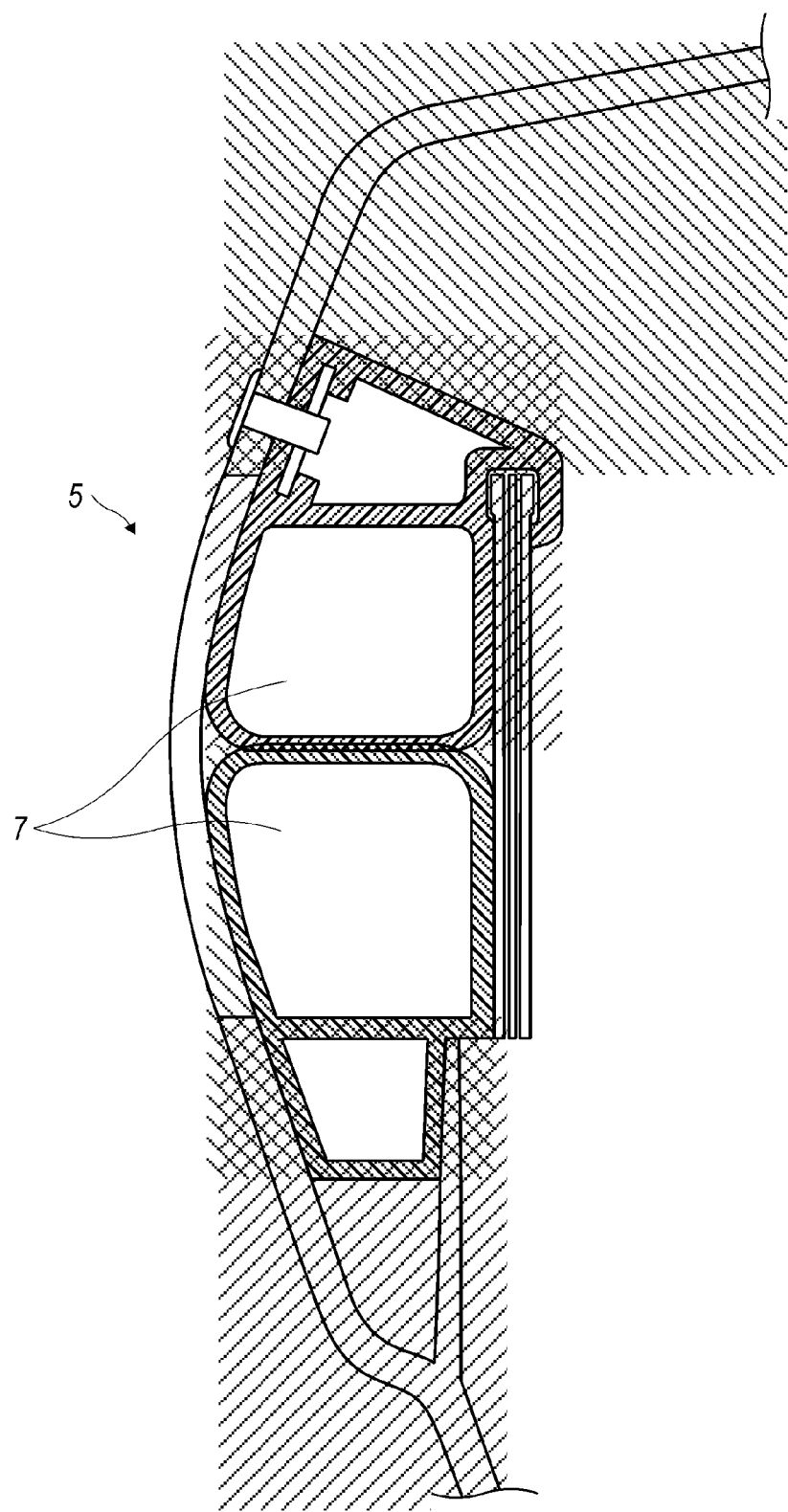
FIG. 14 is a close-up side view of the access aperture of the carrier box.
Figure 15:
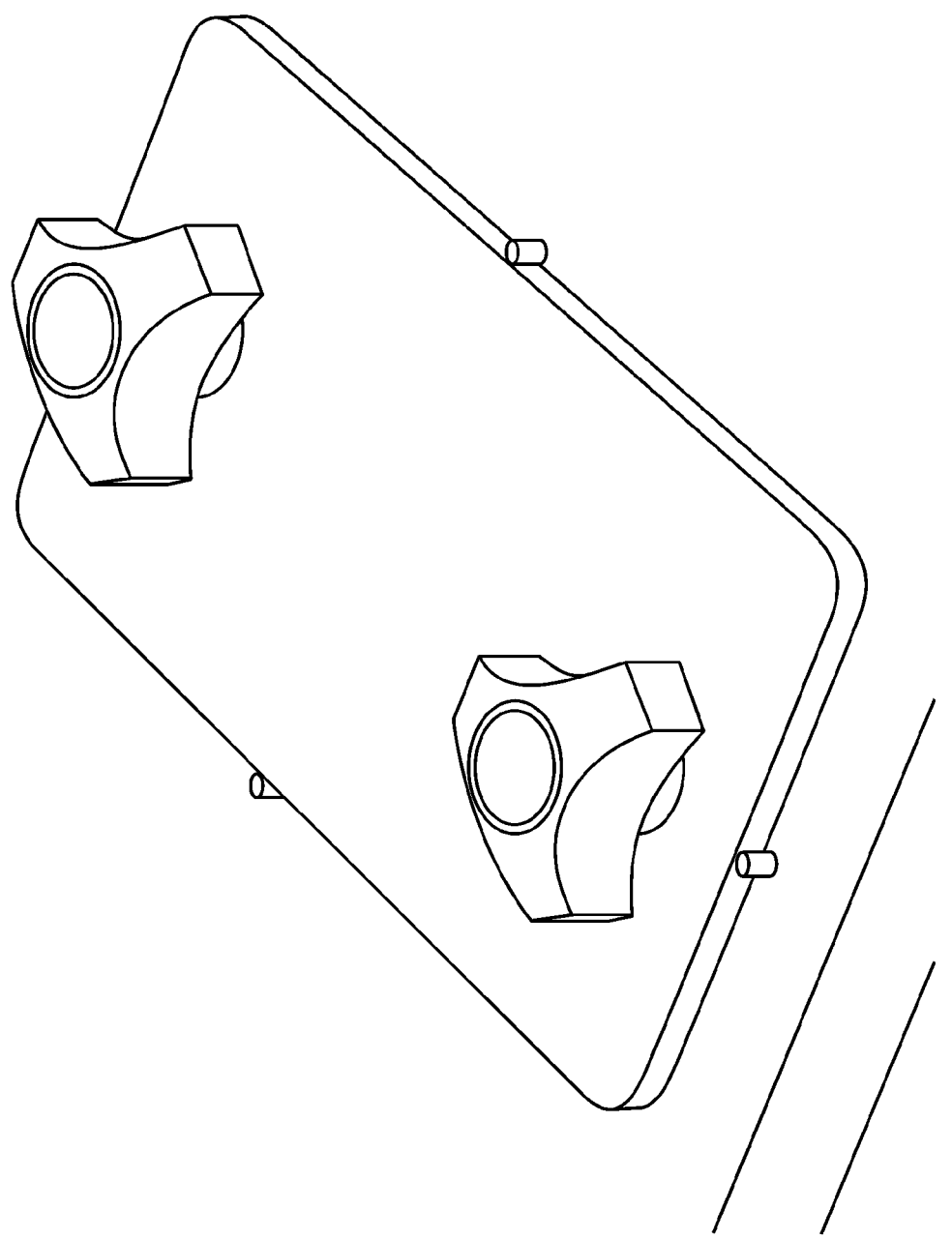
FIG. 15 is a close-up perspective view of the interior of the carrier box showing the threaded fasteners for securing the connecting member to the carrier box.
Figure 16:
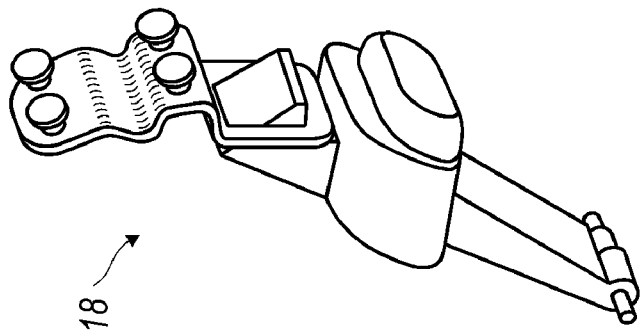
FIG. 16 is a close-up perspective view of the latching members and the lock of the preferred embodiment.
Figure 16:
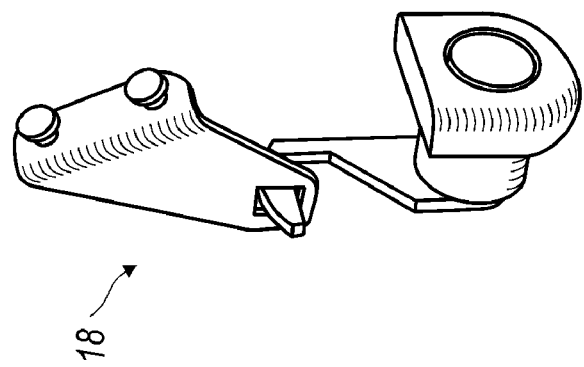
Figure 16:
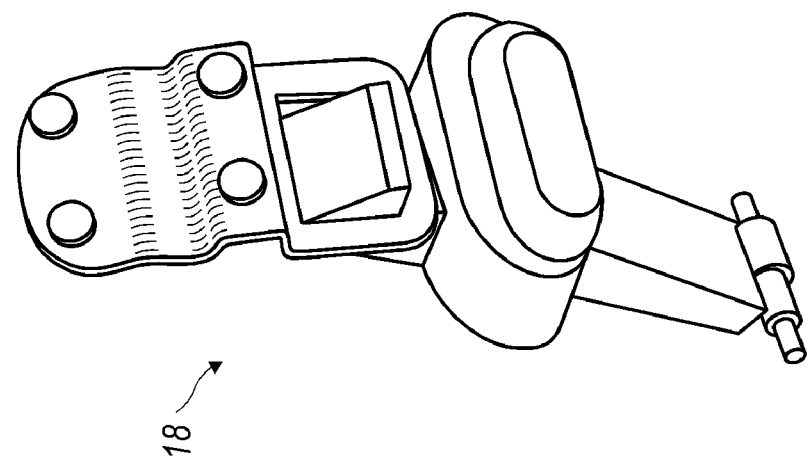
Figure 17:
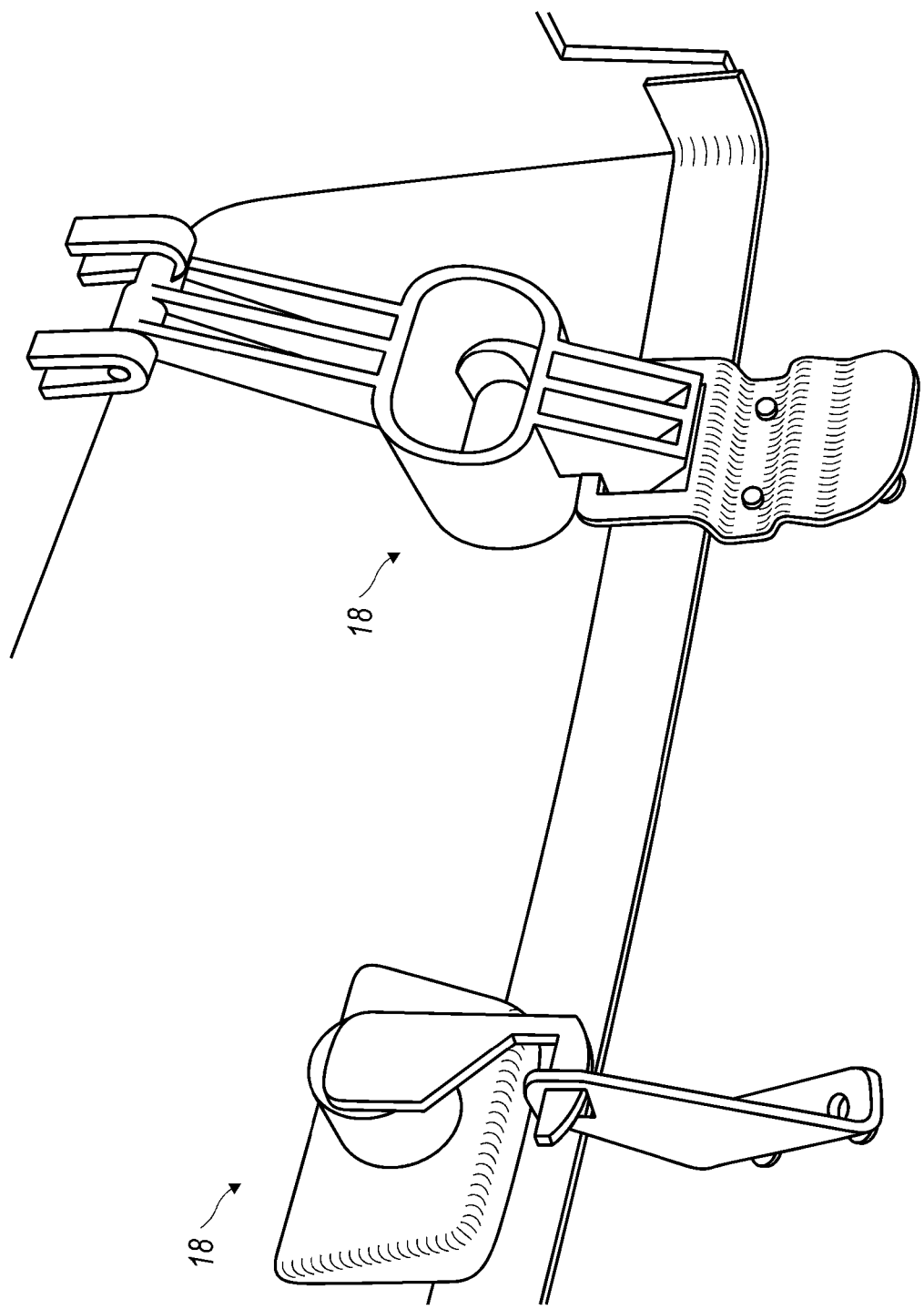
FIG. 17 is a close-up perspective view of the interior of the carrier box showing the lock and latching members of the preferred embodiment.
Figure 18:
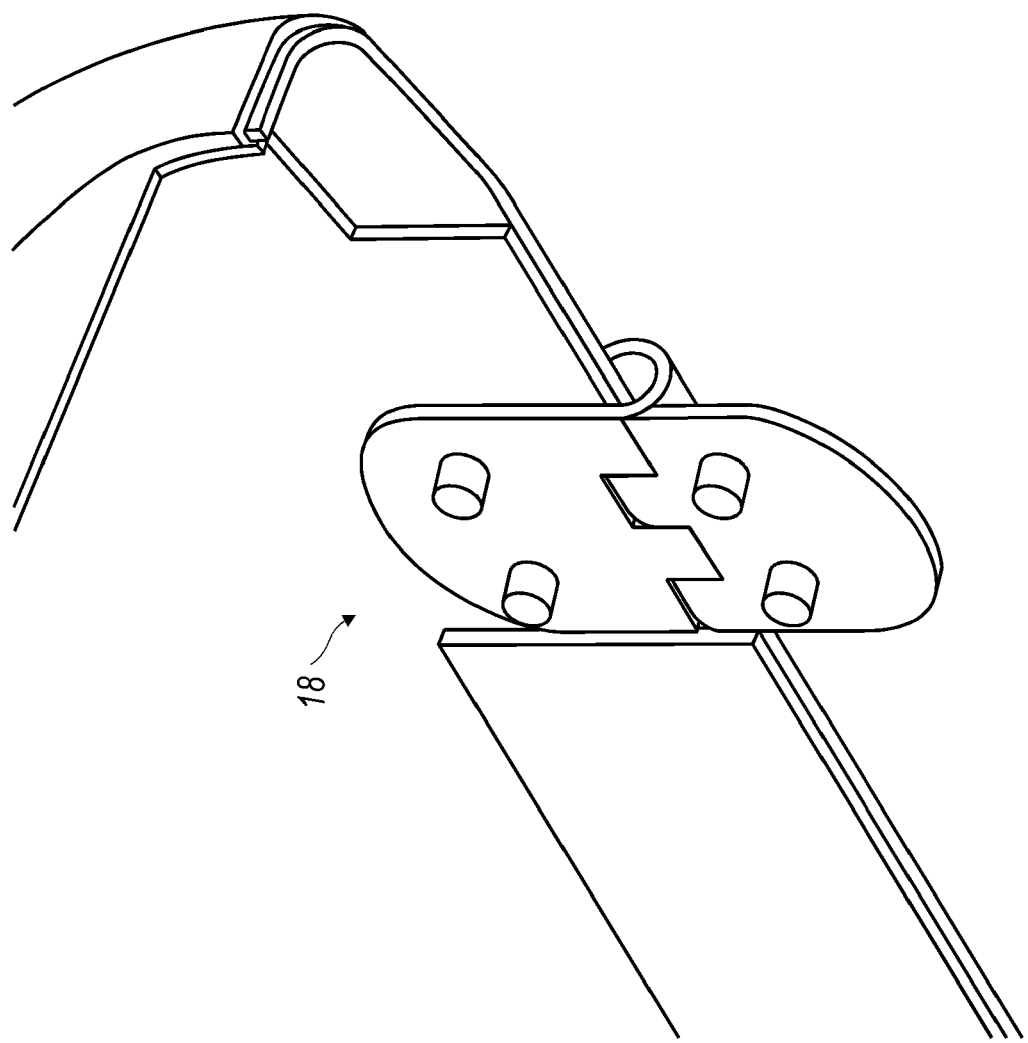
FIG. 18 is a close-up perspective view of a single latching member of the preferred embodiment.
Figure 19:
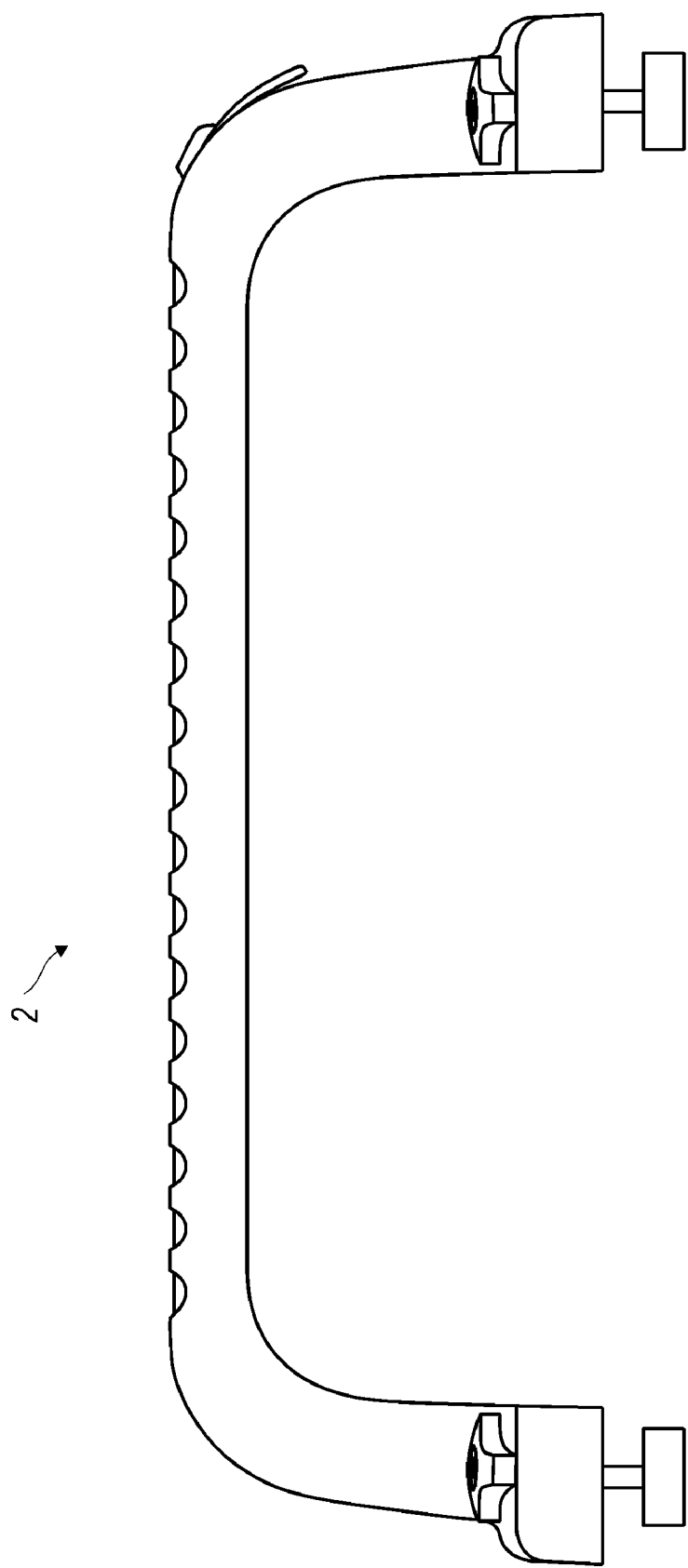
FIG. 19 is side view of the anchor member of the preferred embodiment.
Figure 20:
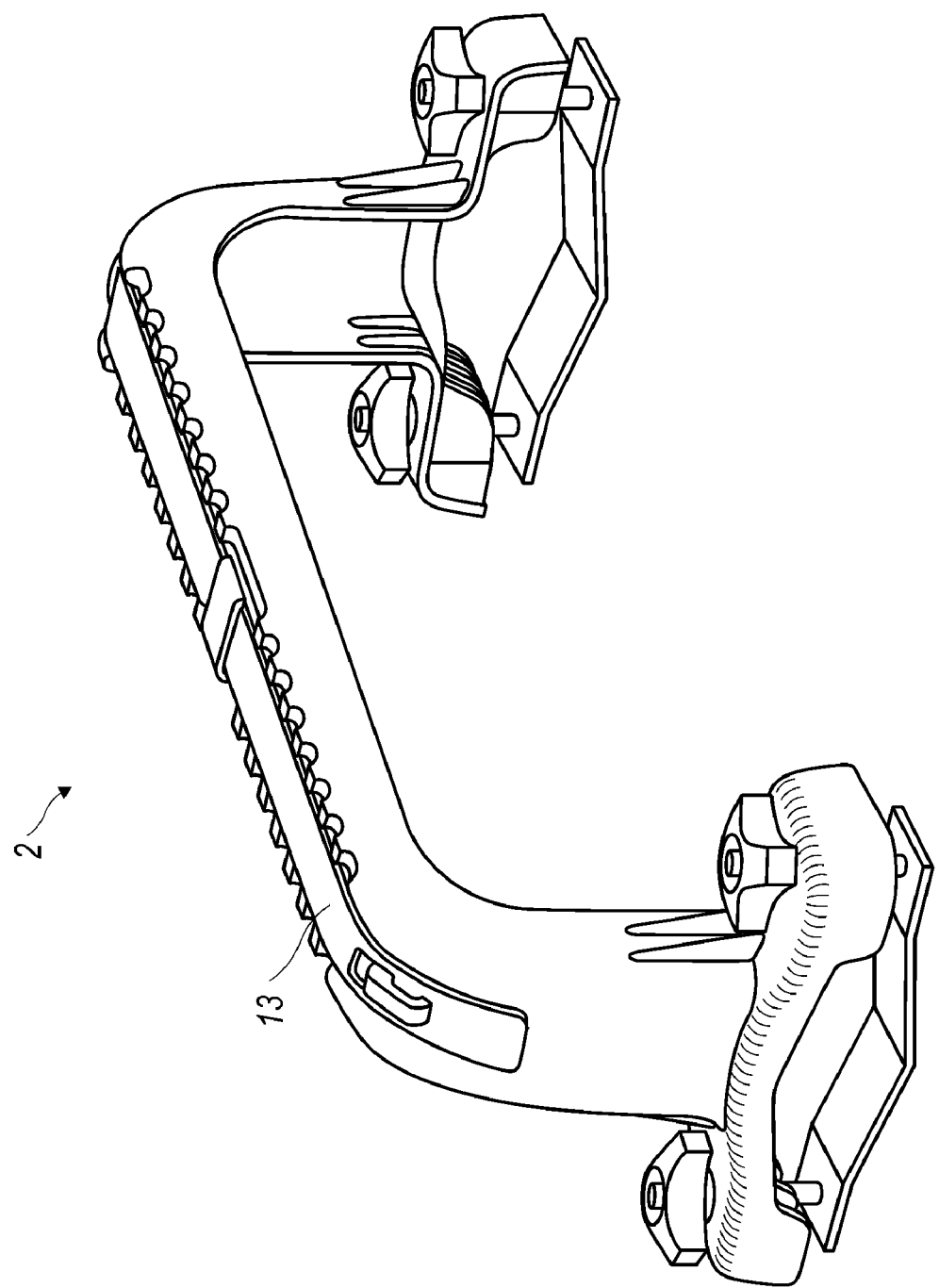
FIG. 20 is perspective view of the anchor member showing the connecting member.
Figure 21:
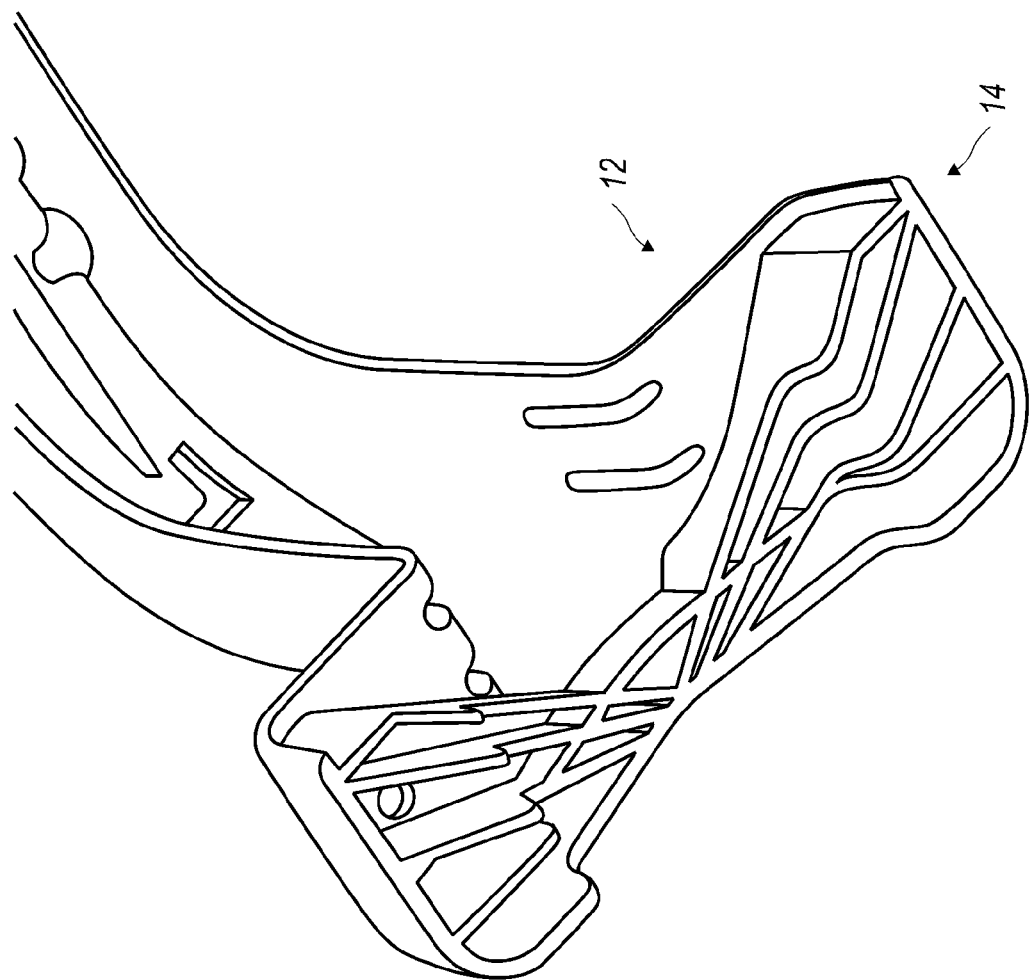
FIG. 21 is a bottom perspective view of the anchor member showing hook of the top portion.
Figure 22:
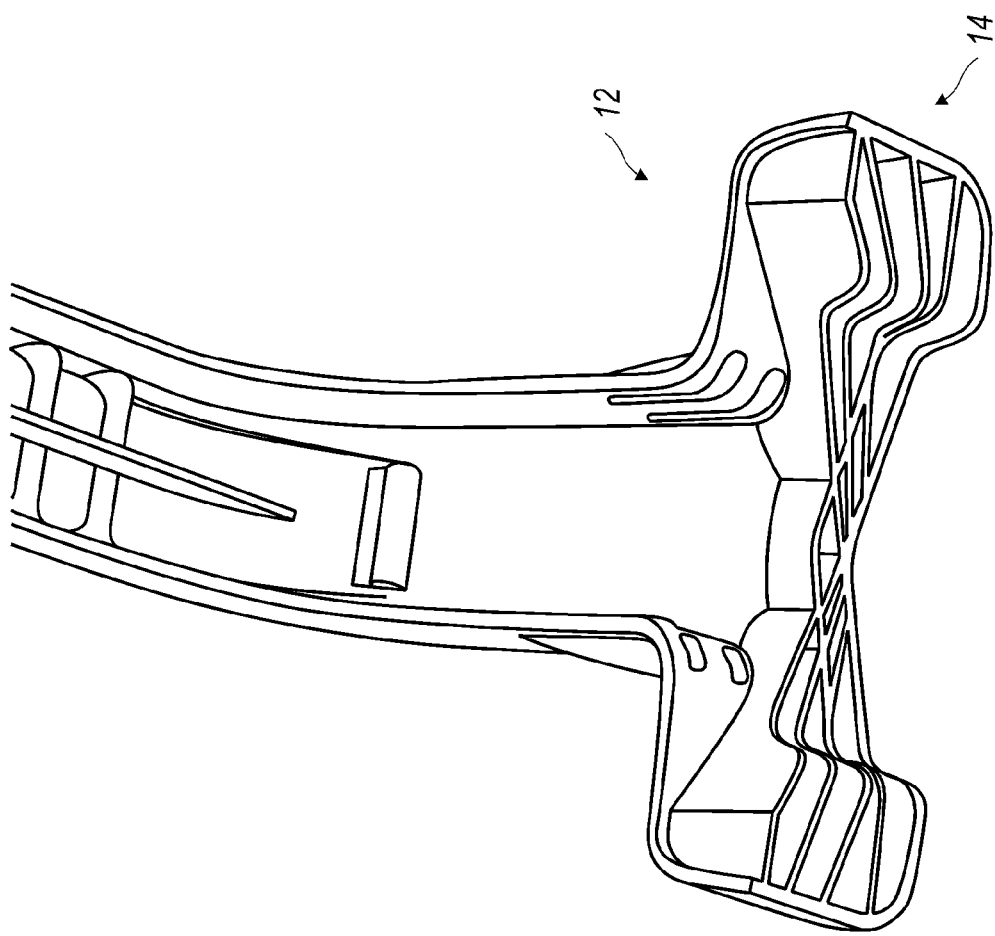
FIG. 22 is a bottom perspective view of the anchor member showing the securing member installed and the bulb of the securing member abutting the end aperture of the top portion.

As mentioned above, in the preferred embodiment, the anchor member 2 is mounted onto a load bar of vehicular roof rack by means of a mounting portion 12 and a connecting member 14, as shown in FIG. 7. The mounting portion preferably comprises a pair of mounting legs each extending in a perpendicular direction from each opposite end of the support member 11. The mounting legs each include a pair of apertures formed proximate to each end of the mounting leg.

The anchor member 2 of the preferred embodiment is mounted to the load bar is a similar fashion as the carrier box, as described above. The connecting member 14 comprises a mounting bracket 15 having at least a pair of threaded bolts or pins and at least a pair of threaded fastening members or knobs. The bracket 15 is configured to fit under a roof rack load bar with the bolts extending upward beyond the load bar. The extending bolts are designed to pass through the apertures formed in the mounting legs from below. The anchor member is then secured to the load bar of the roof rack by threading the fasteners onto the threaded bolts on the top side of the mounting legs.

As with the mounting of the carrier box to the load bar, to assure proper fitting of the anchor member 2 upon load bars of varying designs, an angled or "V-shaped" recess portion 16 is preferably formed in the bottom portion of the mounting legs. A corresponding angled recess portion 17 is fashioned in mounting bracket. The recess portions of the mounting legs and the bracket form a gap between the base portion and the bracket that is wider at the center than at the sides, as shown in FIG. 7. The gap accommodates load bars of different cross-sectional shapes and sizes while balancing and securing a centered orientation of the anchor member upon the load bar.

While the anchor member of the preferred embodiment has been described in detail, it is to be understood by one of ordinary skill in the art that other anchor member designs may be used to secure and retain the distal ends of the fishing rods set therein.

Figure 2:
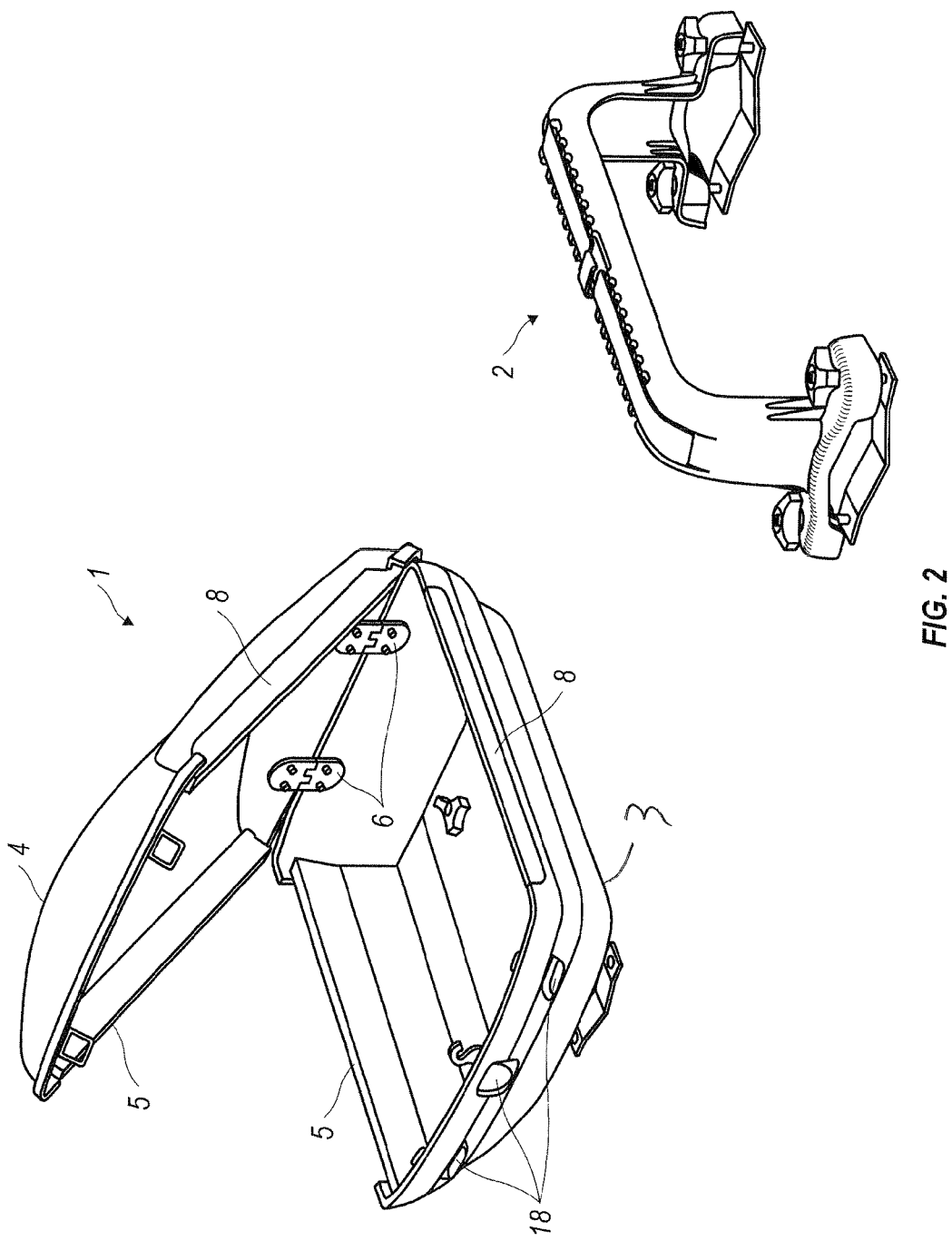
FIG. 2 is a perspective view of the carrier box of the present invention in an open position.

Referring now to the alternative preferred embodiment comprising a storage device and carrier arrangement including a carrier box opening to the side instead of front to back, the storage device and carrier arrangement also includes an anchor member 2. As shown in FIG. 2, this embodiment preferably includes a second access aperture disposed at the rear of the carrier box to accommodate fishing rods having handles of substantial length.

The second access aperture 8 is similarly configured to the first access aperture to permit a portion of the fishing rods connected to the fishing reels set in the carrier box to project outside the carrier box when the box is in a closed configuration. The second access aperture also includes a pliable buffer to maintain the substantially weather-tight interior of the box. With a second access aperture, a portion of the fishing rods connected to fishing reels set inside the box project from both the front and back of the carrier box when the box is in a closed position.

However, while the carrier box of FIG. 2 is illustrated with the lid portion opening to the side and a second access aperture 8, it is to be understood that the carrier box may only include a single access aperture located in the front end of the carrier box, similar to the embodiment of FIG. 1. In this configuration, the butt ends or handles of the fishing rods would be inside the carrier box and not project through the back of the carrier box.

As mentioned, the storage device and carrier arrangement of the present invention is configured for releasable attachment to a vehicular roof rack. Therefore, it is preferred that the device, and particularly the carrier box of the device, includes certain features. The carrier box of the present invention is preferably lockable to protect against accidental loss or theft of the fishing rods and reels stored and carried therein. A locking member is preferably disposed in the center of the forward end of the carrier box The preferred embodiment also includes a plurality of spring-biased latching members 18 to fasten the lid portion of the box to the base portion. A single latching member could conceivably be used, but to provide a more consistent seal between the lid and base portion of the box, at least one latch located proximately to each end of the forward end of the carrier box is preferred. The latches are preferably of a push-button type, biased so that when the push-button is operated, the latch is released. The latch and the push-button may be mounted on either the lid or base portion of the box.

Additionally, the carrier box can be tapered towards the forward end of the box to provide a more aerodynamic surface area when installed or mounted on a vehicle. The carrier box can also include an expanded "hanging" belly portion. With the belly configuration, the carrier box can be mounted to the roof rack load bar at the forward end of the belly to give the carrier box a lower profile and increase the box's aerodynamic properties. The anchor member is designed to minimize wind resistance as well.

Moreover, the carrier arrangement can be used as a carrying device for transporting fishing rods and reels to and from the vehicle. Therefore, the carrier arrangement includes a handle, preferably attached to the exterior of the carrier box, and the carrier arrangement is manufactured out of lightweight material, making the arrangement easier to carry. Also, the rear end of the box can be formed to be substantially flat so that when the storage device and carrier arrangement is detached from the vehicular roof rack it will stand on the flattened rear end and serve as a support stand for the fishing rods and reels.

The carrier arrangement is also preferably symmetrically designed. The carrier box and the anchor member is advantageously designed to be used on both the left and right sides of the vehicular roof rack and multiple carrier arrangements may be mounted on a single vehicular roof rack simultaneously. Moreover, the carrier box is configured to provide satisfactory clearance between the lid portions of two boxes adjacent and simultaneously opened boxes.

Figure 23:
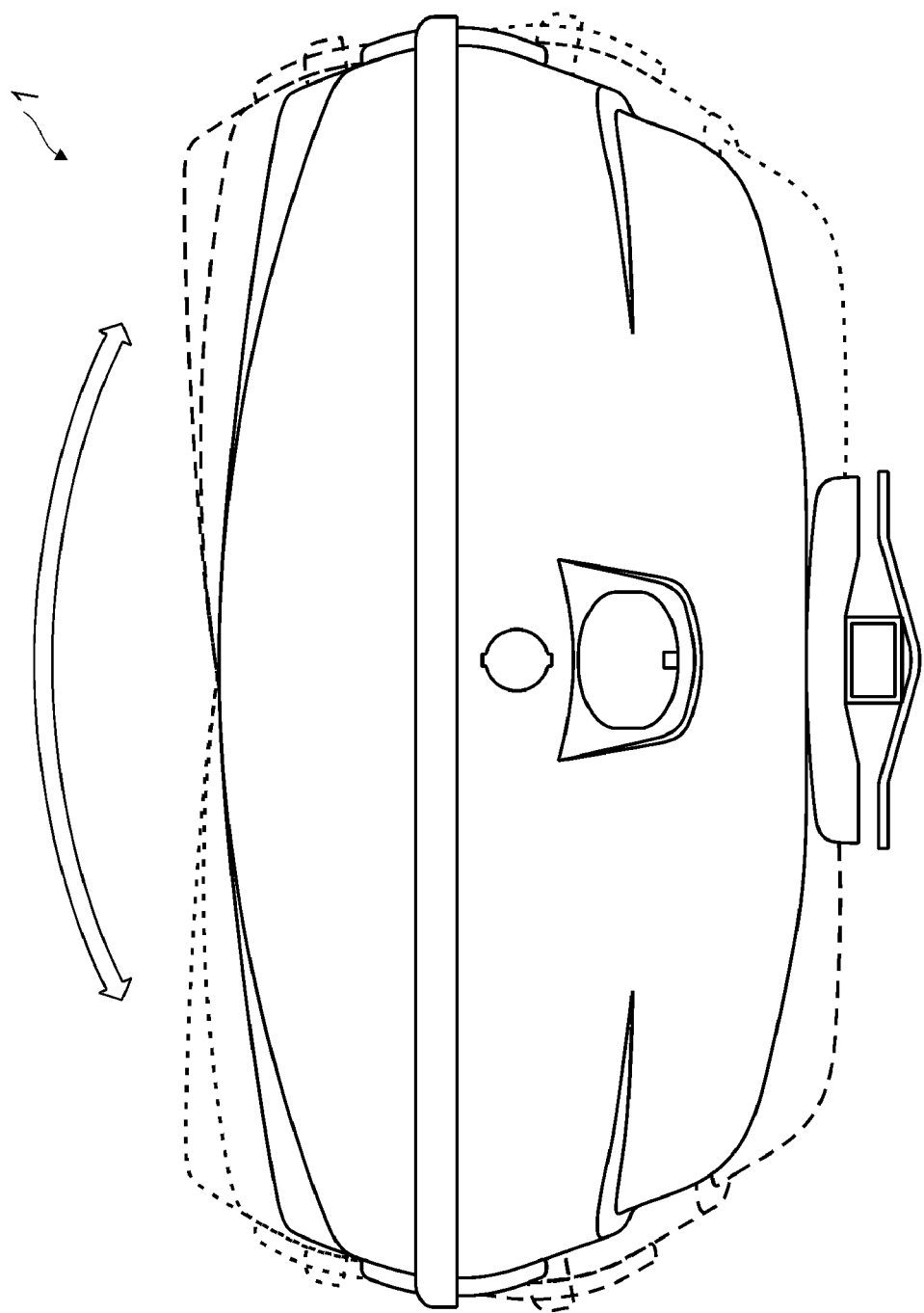
FIG. 23 is side perspective view of the carrier box in which an adjustable interconnection is utilized between the carrier box and the crossbar (shown as rectangular cross-section) of the supporting cargo rack.

FIG. 23 illustrates an alternative embodiment in which an adjustable connection arrangement is provided for attaching either of the two units (carrier box and the anchor member) to its respective crossbar. The invention of the adjustable connection stems from the fact that the two units are individually located on their respective crossbars without interconnection therebetween. Therefore, since it is purposed that carried items will be connected between the otherwise disconnected units, a capability was needed for adjusting one or both of the two different units so that requisite alignment between receiving portions of the two units for items to be carried thereupon can be established. As may be appreciated from the illustration, the carrier box is exemplarily enabled to be essentially pivoted about the crossbar. It is contemplated that this pivotation can be enabled in any of a number of different ways which can be envisioned by those persons skilled in the art upon being directed toward this inventive concept and the disclosed needs of the user to establish necessary, and possibly variable, alignment between the cargo receiving portions of the two separated units.

The invention claimed is:

1. A carrier arrangement for a fishing rod and reel configured to be mounted to a carrying vehicle, said carrier arrangement comprising:

a carrier box formed from a lid portion and a base portion configurable between open and closed configurations, said lid portion having a top roof portion extending downward to a front side portion, a rear side portion arranged opposite said front side portion, and a first side portion and a second side portion extending longitudinally between said front side and rear side portions, each forming an edge for contact with said base portion, said base portion having a lower floor portion with an edge extending upward to a front side portion, a rear side portion opposite said front side portion, and a first side portion and a second side portion extending longitudinally between said front side and rear side portions, each forming an edge for contact with said lid portion, said edge of said lid portion and said edge of said base portion contacting one another in said closed configuration to form a substantially weather-tight seal and forming a void cavity within said carrier box, said box configured to receive a fishing rod with said front side portions contacting said fishing rod and said rear side portions contacting a different portion of said fishing rod, said carrier box sized to contain a fishing reel attached to said fishing rod within an interior of said carrier box, said front side portion of said lid portion and said front side portion of said base portion each having an aperture together forming an access aperture in said front side portions when said box is in said closed configuration, a pliable buffer arranged within an interior of said access aperture, said pliable buffer comprising at least two mating portions extending across the entirety of the access aperture in the closed configuration and adapted to form-fit about a portion of the fishing rod positioned therein and selectively manufactured from a material that forms a weather-resistant barrier between the interior and an exterior of said carrier box in the closed configuration when a fishing rod is installed therein, and a clamping arrangement attached to an underside of said base portion, said clamping arrangement configured to releasably fasten upon a vehicular carrier rack.

2. The carrier arrangement of claim 1 wherein a portion of said carrier box is adapted to form a stand thereby accommodating use of said carrier box as a free-standing storage arrangement for at least one fishing rod and reel when said carrier box is detached from a vehicular carrier rack.

3. The carrier arrangement of claim 1 wherein said lid portion and said base portion are hinged together for pivotation relative one to the other and a seal arrangement is provided between said at least two mating lip portions of said pliable buffer for affecting a seal between said lid and base portions in the closed configuration.

4. The carrier arrangement of claim 1 wherein said carrier box tapers toward a forward end thereof for aerodynamic purposes when installed on a carrying vehicle.

5. The carrier arrangement of claim 4 wherein said access aperture is formed through said carrier box at said forward end.

6. The carrier arrangement of claim 1, wherein said carrier box having drainage holes located in a bottom of said base portion.

7. The carrier arrangement of claim 1 comprising at least one additional access aperture.

8. The carrier arrangement of claim 1 further comprising an anchor arrangement having a top portion for securing a distal end of said fishing rod, wherein heights of said top portion and said access aperture are of substantially the same level so that a fishing rod is substantially level to a roof of said vehicle when said carrier arrangement is mounted thereon.

9. The carrier arrangement of claim 1 wherein said access aperture is located in said front end of said carrier box and forms a substantially rectangular shape when said carrier box is in said closed position.

10. The carrier arrangement of claim 9 wherein said access aperture is sized to carry more than one fishing rod within said access aperture.

11. A carrier arrangement for a fishing rod and reel configured to be mounted to a carrying vehicle, said carrier arrangement comprising:

a carrier box formed from a lid portion and a base portion configurable between open and closed configurations, said lid portion having a top roof portion extending downward to a front side portion, a rear side portion arranged opposite said front side portion, and a first side portion and a second side portion extending longitudinally between said front side and rear side portions, each forming an edge for contact with said base portion, said base portion having a lower floor portion with an edge extending upward to a front side portion, a rear side portion opposite said front side portion, and a first side portion and a second side portion extending longitudinally between said front side and rear side portions, each forming an edge for contact with said lid portion, said edge of said lid portion and said edge of said base portion contacting one another in said closed configuration to form a substantially weather-tight seal and forming a void cavity within said carrier box, said box configured to receive a fishing rod with said front side portions contacting said fishing rod and said rear side portions contacting a different portion of said fishing rod, said carrier box sized to contain a fishing reel attached to said fishing rod within an interior of said carrier box, said front side portion of said lid portion and said front side portion of said base portion each having an aperture together forming an access aperture in said front side portions when said box is in said closed configuration, a pliable buffer arranged within an interior of said access aperture, said pliable buffer comprising at least two mating portions extending across the entirety of the access aperture in the closed configuration and adapted to form-fit about a portion of the fishing rod positioned therein and selectively manufactured from a material that forms a weather-resistant barrier between the interior and an exterior of said carrier box in the closed configuration when a fishing rod is installed therein, and a clamping arrangement attached the underside of said base portion, said clamping arrangement configured to releasably fasten upon a vehicular carrier rack, and an anchor arrangement comprising one or more concave grooves on a top surface of the anchor arrangement for receiving one or more fishing rods, wherein the anchor arrangement is separate from said carrier box and attachable to said vehicular carrier rack a distance away from said carrier box for securing a distal end of a fishing rod installed in said carrier box.

* * * * *